(12) United States Patent
Bulick et al.

(10) Patent No.: US 12,209,153 B2
(45) Date of Patent: *Jan. 28, 2025

(54) AQUEOUS ADHESIVE COMPOSITIONS

(71) Applicant: SWIMC LLC, Cleveland, OH (US)

(72) Inventors: Allen Bulick, Bolingbrook, IL (US); Chris Fredrickson, Delavan, WI (US); Mary Jane Hibben, Elburn, IL (US); Robert Sandoval, Crystal Lake, IL (US); Ashley Rodgers, Rockford, IL (US); Glenn Frazee, Twin Lakes, WI (US)

(73) Assignee: SWIMC LLC, Cleveland, OH (US)

( * ) Notice: Subject to any disclaimer, the term of this patent is extended or adjusted under 35 U.S.C. 154(b) by 366 days.

This patent is subject to a terminal disclaimer.

(21) Appl. No.: 17/127,597

(22) Filed: Dec. 18, 2020

(65) Prior Publication Data

US 2021/0102098 A1    Apr. 8, 2021

Related U.S. Application Data

(63) Continuation of application No. 16/383,398, filed on Apr. 12, 2019, now Pat. No. 10,870,782.

(60) Provisional application No. 62/657,518, filed on Apr. 13, 2018.

(51) Int. Cl.
| | | |
|---|---|---|
| C08F 220/18 | (2006.01) |
| C09J 133/06 | (2006.01) |
| E04D 7/00 | (2006.01) |
| E04D 11/02 | (2006.01) |

(52) U.S. Cl.
CPC ..... C08F 220/1804 (2020.02); C09J 133/062 (2013.01); C09J 133/066 (2013.01); E04D 7/00 (2013.01); E04D 11/02 (2013.01); C08F 220/1806 (2020.02); C08F 2800/20 (2013.01)

(58) Field of Classification Search
CPC .. C09J 133/066; C09J 133/062; C08F 220/18; C08F 220/1825; C08F 2220/1841; C08F 2800/20; E04D 7/00; E04D 11/02
USPC ........................................................ 524/458
See application file for complete search history.

(56) References Cited

U.S. PATENT DOCUMENTS

| | | | |
|---|---|---|---|
| 4,588,417 A * | 5/1986 | Zaweski ................ | C10L 10/04 44/325 |
| 4,897,137 A | 1/1990 | Miller et al. | |
| 4,997,882 A | 3/1991 | Martz et al. | |
| 5,234,987 A | 8/1993 | Hubbard et al. | |
| 5,849,133 A | 12/1998 | Senderling et al. | |
| 6,060,532 A * | 5/2000 | Frankel ................ | C09D 151/00 522/110 |
| 6,084,024 A * | 7/2000 | Mao ...................... | C08F 218/10 526/328.5 |
| 6,107,382 A | 8/2000 | Williams et al. | |
| 6,297,312 B1 | 10/2001 | Wang | |
| 6,300,414 B1 | 10/2001 | McGee et al. | |
| 6,337,360 B1 | 1/2002 | Scheuermann et al. | |
| 6,391,461 B1 | 5/2002 | Ryntz et al. | |
| 6,479,163 B2 | 11/2002 | Kawano et al. | |
| 6,762,230 B2 | 7/2004 | Bradenburger et al. | |
| 6,825,278 B2 | 11/2004 | Holub et al. | |
| 6,841,619 B2 | 1/2005 | McGee et al. | |
| 6,939,916 B2 | 9/2005 | Merritt et al. | |
| 7,279,541 B2 | 10/2007 | Centner et al. | |
| 7,368,155 B2 | 5/2008 | Larson et al. | |
| 7,641,964 B2 | 1/2010 | Swei et al. | |
| 7,649,067 B2 | 1/2010 | Zecha et al. | |
| 7,803,867 B2 | 9/2010 | Hanrahan et al. | |
| 7,816,449 B2 | 10/2010 | Menovcik et al. | |
| 8,063,141 B2 | 11/2011 | Fisher | |
| 8,084,527 B2 | 12/2011 | Paschkowski et al. | |
| 8,202,932 B2 | 6/2012 | Kneafsey et al. | |
| 8,435,639 B2 | 5/2013 | Rokowski et al. | |
| 8,448,408 B2 | 5/2013 | Kalwara | |
| 8,713,879 B2 | 5/2014 | Wiercinski et al. | |

(Continued)

FOREIGN PATENT DOCUMENTS

| | | |
|---|---|---|
| CN | 1072433 | 5/1993 |
| CN | 1192446 | 9/1998 |

(Continued)

OTHER PUBLICATIONS

Office Action from counterpart Canadian Application No. 3,096,469 dated Jan. 24, 2022, 3 pp.

(Continued)

*Primary Examiner* — Kelechi C Egwim

(74) *Attorney, Agent, or Firm* — Honigman LLP

(57) ABSTRACT

A latex emulsion that includes an aqueous carrier liquid and a latex copolymer formed from reactants comprising butyl methacrylate, wherein the reactants comprise at least 20 wt. % a vinyl monomer, based on the total weight of ethylenically unsaturated monomers in the latex copolymer. A homopolymer formed from the vinyl monomer preferably exhibits a glass transition temperature of between about −10° C. and about 30° C. A coating formed from the latex emulsion preferably exhibits a dry adhesion of greater than about 4 pounds per linear inch when applied between a thermoplastic polyolefin roofing membrane and a plywood roofing substrate at an average coat weight of about 6 lbs/100 ft² and subjected to 180° peel testing according to ASTM D903 with a 2-inch per minute pull rate. The latex emulsion may include a second latex copolymer or stage, and may be used as part of an aqueous adhesive composition.

13 Claims, 4 Drawing Sheets

(56) References Cited

U.S. PATENT DOCUMENTS

| | | | |
|---|---|---|---|
| 8,993,667 | B2 | 3/2015 | Rokowski et al. |
| 9,193,880 | B2 | 11/2015 | Allam et al. |
| 9,365,745 | B2 | 6/2016 | Gerst et al. |
| 9,528,268 | B2 | 12/2016 | Hubbard |
| 9,688,872 | B2 | 6/2017 | Power et al. |
| 10,208,148 | B2 | 2/2019 | Corten et al. |
| 10,858,532 | B2 | 12/2020 | Hibben et al. |
| 10,870,782 | B2 | 12/2020 | Bulick et al. |
| 2004/0102568 | A1* | 5/2004 | Bridgewater ...... C09D 133/062 524/556 |
| 2006/0100357 | A1 | 5/2006 | Bunn et al. |
| 2009/0035587 | A1 | 5/2009 | Killilea et al. |
| 2010/0204394 | A1 | 8/2010 | Balk et al. |
| 2010/0326598 | A1 | 12/2010 | Atwater |
| 2011/0275748 | A1 | 11/2011 | Griffith et al. |
| 2014/0235780 | A1 | 8/2014 | Rokowski et al. |
| 2014/0377576 | A1 | 12/2014 | Batra et al. |
| 2016/0108296 | A1 | 4/2016 | Tang |
| 2016/0312471 | A1 | 10/2016 | Hubbard et al. |
| 2016/0369122 | A1 | 12/2016 | Rokowski et al. |
| 2019/0315995 | A1 | 10/2019 | Hibben et al. |

FOREIGN PATENT DOCUMENTS

| | | |
|---|---|---|
| CN | 1072433 C | 10/2001 |
| CN | 1502665 | 6/2004 |
| CN | 1951996 A | 4/2007 |
| CN | 101463108 A | 6/2009 |
| CN | 103476886 | 12/2013 |
| CN | 105408437 | 3/2016 |
| CN | 106029716 A | 10/2016 |
| EP | 0672738 | 9/1995 |
| EP | 0965598 A1 | 12/1999 |
| EP | 0977806 A1 | 2/2000 |
| EP | 0982353 A1 | 3/2000 |
| EP | 2778195 B1 | 4/2017 |
| KR | 20090079711 A | 7/2009 |
| KR | 20090087704 A | 8/2009 |
| WO | 9850465 | 11/1998 |
| WO | 2014097309 A1 | 6/2014 |
| WO | 2015130729 A1 | 9/2015 |
| WO | 2017091490 A1 | 6/2017 |
| WO | 2019043024 A1 | 3/2019 |
| WO | 2019097041 A1 | 5/2019 |

OTHER PUBLICATIONS

U.S. Appl. No. 17/113,906, filed Dec. 7, 2020 naming inventors Hibben et al.
Zhang et al., "Catechol-Functionalized Latex Polymers Display Improved Adhesion to Low-Surface-Energy Thermoplastic Polyolefin Substrates," Applied Polymer Materials, published May 10, 2019, 9 pp.
International Preliminary Report on Patentability of International Application No. PCT/US2019/027361, mailed Oct. 22, 2020, 8 pp.
International Search Report and Written Opinion of International Application No. PCT/US2019/027361, mailed Jun. 17, 2019, 13 pp.
Prosecution History from U.S. Appl. No. 16/383,359, dated May 30, 2019 through Nov. 4, 2020, 109 pp.
Prosecution History from U.S. Appl. No. 16/383,398, dated Jun. 12, 2019 through Nov. 12, 2020, 109 pp.
Office Action from counterpart Australian Application No. 2019253020 dated May 26, 2021, 4 pp.
Office Action from counterpart Australian Application No. 2019253017 dated May 26, 2021, 4 pp.
Response to Rule 161 EPC dated Nov. 25, 2020, from counterpart European application number 19722331.6, filed Jun. 7, 2021, 20 pp.
Response to Rule 161 EPC dated Nov. 20, 2020, from counterpart European application number 19720299.7, filed May 31, 2021, 16 pp.
Brazilian Official Action re: serial No. BR112020020738-1, dated Jan. 8, 2022.
Response to Australian Office Action dated May 26, 2021, from counterpart Australian application No. 2019253020, filed Oct. 11, 2021, 18 pp.
First Office Action and Search Report, and translation thereof, from counterpart Chinese Application No. 201980025264.3 dated Nov. 16, 2021, 23 pp.
Notice of Acceptance from counterpart Australian Application No. 2019253020 dated Nov. 24, 2021, 3 pp.
Communication pursuant to Article 94(3) EPC for European Patent Application 19722331.6, dated Apr. 5, 2024.

* cited by examiner

US 12,209,153 B2

AQUEOUS ADHESIVE COMPOSITIONS

PRIORITY CLAIM

This application is a continuation of U.S. application Ser. No. 16/383,398, filed Apr. 12, 2019, which claims the benefit of U.S. Provisional Application No. 62/657,518, filed Apr. 13, 2018. The entire contents of each of these applications are hereby incorporated by reference in their entirety.

BACKGROUND

Polymeric membranes, such as, for example, thermoplastic polyolefin (TPO) membranes, ethylene propylene diene monomer (EPDM) rubber membranes, and poly(vinyl chloride) (PVC) membranes are widely used as coverings for roof surfaces of buildings. TPO, EPDM rubber, and PVC membranes may be installed as white, single-ply membranes to provide a solar reflective surface which saves money on energy costs related to cooling the building.

TPO, EPDM rubber, and PVC membranes may be installed using mechanical fasteners or adhesives. Many adhesives used for installing TPO, EPDM rubber, and PVC membranes are solvent-based with high volatile organic content (VOC). Water-based adhesives also may be used, but available water-based adhesives tend to have poor performance due to the low energy surface of the membranes.

SUMMARY

In some examples, the disclosure describes a latex emulsion that includes an aqueous carrier liquid and a latex copolymer formed from reactants comprising butyl methacrylate, wherein the reactants comprise at least 20 weight percent (wt. %) butyl methacrylate, 2-ethylhexyl methacrylate, VeoVa™ 10, or combinations thereof, based on the total weight of ethylenically unsaturated monomers used to make the latex copolymer. A coating formed from the latex emulsion optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

In some examples, the disclosure describes a latex emulsion that includes an aqueous carrier liquid; a first latex copolymer or stage formed from first reactants comprising butyl methacrylate, 2-ethylhexyl methacrylate, VeoVa 10, or combinations thereof, wherein the first latex copolymer comprises at least 20 wt. % butyl methacrylate, based on the total weight of ethylenically unsaturated monomers used to make the first latex copolymer or stage; and a second latex copolymer or stage formed from second reactants comprising a (meth)acrylate monomer other than butyl methacrylate. A coating formed from the latex emulsion optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

In some examples, the disclosure describes an aqueous adhesive composition that includes an aqueous carrier liquid; a dispersant, a biocide, a fungicide, an UV stabilizer, a thickener, a wetting agent, a defoamer, a filler, a pigment or colorant, a tackifier, or combinations thereof; and a latex copolymer formed from reactants comprising a vinyl monomer having an alkyl group including between 2 and 20 carbon atoms, wherein the reactants comprise at least 20 wt. % of the vinyl monomer having an alkyl group including between 2 and 20 carbon atoms, based on the total weight of ethylenically unsaturated monomers used to make the latex copolymer, and wherein a homopolymer formed from the vinyl monomer exhibits a glass transition temperature of between about −10° C. and about 30° C. A coating formed from the aqueous adhesive composition optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

In some examples, the disclosure describes a method including reacting reactants comprising a vinyl monomer having an alkyl group including between 2 and 20 carbon atoms to form a latex emulsion including a latex copolymer, wherein the reactants comprise at least 20 wt. % of the vinyl monomer having an alkyl group including between 2 and 20 carbon atoms, based on the total weight of ethylenically unsaturated monomers used to make the latex copolymer, and wherein a homopolymer formed from the vinyl monomer exhibits a glass transition temperature of between about −10° C. and about 30° C. A coating formed from the latex emulsion optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

In some examples, the disclosure describes an aqueous adhesive composition that includes an aqueous carrier liquid; a dispersant, a biocide, a fungicide, an UV stabilizer, a thickener, a wetting agent, a defoamer, a filler, a pigment or colorizer, a tackifier, or combinations thereof; a first latex copolymer or stage formed from first reactants comprising a vinyl monomer having an alkyl group including between 2 and 20 carbon atoms, wherein the reactants comprise at least 20 wt. % of the vinyl monomer having an alkyl group including between 2 and 20 carbon atoms, based on the total weight of ethylenically unsaturated monomers used to make the first latex copolymer or stage, and wherein a homopolymer formed from the vinyl monomer exhibits a glass transition temperature of between about −10° C. and about 30° C.; and a second latex copolymer or stage formed from second reactants comprising a (meth)acrylate monomer other than the methacrylate having an alkyl group including between 2 and 20 carbon atoms. A coating formed from the aqueous adhesive composition optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

In some examples, the disclosure describes a method that includes reacting first reactants comprising a vinyl monomer having an alkyl group including between 2 and 20 carbon atoms to form a first latex copolymer or stage, wherein the first reactants comprise at least 20 wt. % of the vinyl monomer having an alkyl group including between 2 and 20 carbon atoms, based on the total weight of ethylenically unsaturated monomers used to make the first latex copolymer or stage, and wherein a homopolymer formed from the vinyl monomer exhibits a glass transition temperature of between about −10° C. and about 30° C. The method also includes reacting second reactants comprising a (meth) acrylate monomer other than the at least one methacrylate having an alkyl group including between 2 and 20 carbon atoms to form a second latex copolymer or stage. A coating formed from a latex emulsion including the first latex copolymer or stage and the second latex copolymer or stage optionally and preferably exhibits a dry adhesion of greater than about 4 pound per linear inch when applied between a thermoplastic polyolefin roofing membrane and a plywood roofing substrate at an average coat weight of about 6 lbs/100 ft² and subjected to 180° peel testing according to ASTM D903 with a 2-inch per minute pull rate.

In some examples, the disclosure describes a roofing product that includes a polymeric roofing material, an adhesive on a surface of the polymeric roofing membrane for adhering the polymeric roofing membrane to a roofing substrate, and a removable backing membrane on the adhesive. The adhesive may include any of the latex emulsions described herein.

In some examples, the disclosure describes a roofing product that includes a polymeric roofing material, an adhesive on a surface of the polymeric roofing material for adhering the polymeric roofing membrane to a roofing substrate, and a removable backing membrane on the adhesive. The adhesive may include any of the aqueous adhesive compositions described herein.

The details of one or more examples are set forth in the accompanying drawings and the description below. Other features, objects, and advantages of the disclosure will be apparent from the description and drawings, and from the claims.

DETAILED DESCRIPTION

Figure 1:
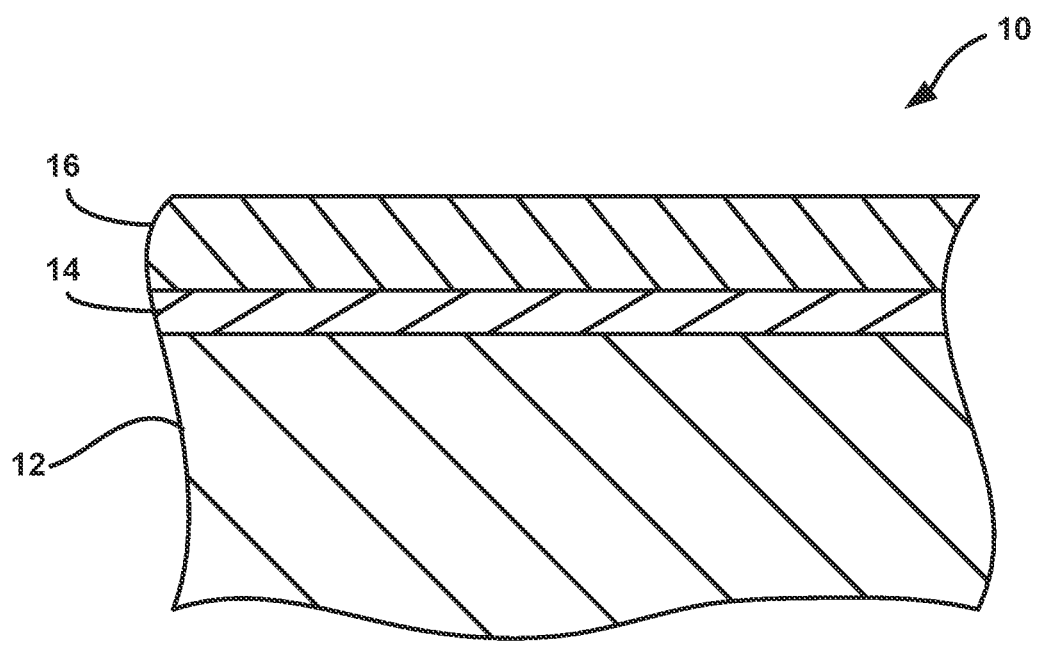
FIG. 1 is a schematic, cross-sectional view of a roofing membrane adhered to a substrate using a latex-based adhesive in accordance with examples of this disclosure.

A "latex" polymer means a dispersion or emulsion of polymer particles formed in the presence of water and one or more dispersing or emulsifying agents (e.g., a surfactant, alkali-soluble polymer, or mixtures thereof) whose presence is required to form the dispersion or emulsion. The dispersing or emulsifying agent is typically separate from the polymer after polymer formation. In some examples, a reactive dispersing or emulsifying agent may become part of the polymer particles as they are formed.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The phrase "low VOC" when used with respect to a liquid coating composition means that the liquid coating composition contains less than about 150 grams VOC per L composition excluding exempt solvent weight (g VOC/L composition; about 15% w/v) by U.S.A. EPA Method 24, preferably not more than about 100 g VOC/L composition (about 10% w/v), more preferably not more than about 50 g VOC/L composition (about 5% w/v), and most preferably less than 20 g VOC/L composition (about 2% w/v), for example not more than about 10 g VOC/L composition (about 1% w/v) or not more than about 8 g VOC/L composition (about 0.8% w/v) volatile organic compounds.

The term "(meth)acrylic acid" includes either or both of acrylic acid and methacrylic acid, and the term "(meth) acrylate" includes either or both of an acrylate and a methacrylate.

The term "multistage" when used with respect to a latex means the latex polymer was made using discrete charges of one or more monomers or was made using a continuously-varied charge of two or more monomers. Oftentimes a multistage latex will not exhibit a single $T_g$ inflection point as measured using DSC. For example, a DSC curve for a multistage latex made using discrete charges of one or more monomers may exhibit two or more $T_g$ inflection points. Also, a DSC curve for a multistage latex made using a continuously-varied charge of two or more monomers may exhibit no $T_g$ inflection points. By way of further explanation, a DSC curve for a single stage latex made using a single monomer charge or a non-varying charge of two monomers may exhibit only a single $T_g$ inflection point. Occasionally when only one $T_g$ inflection point is observed, it may be difficult to determine whether the latex represents a multistage latex. In such cases a lower $T_g$ inflection point may sometimes be detected on closer inspection, or the synthetic scheme used to make the latex may be examined to determine whether or not a multistage latex would be expected to be produced.

The present disclosure describes latex emulsions and aqueous adhesive compositions including latex emulsions that have relatively high dry adhesion to polymeric roofing membranes, such as TPO membranes, EPDM rubber membranes, or PVC membranes. The latex emulsions and aqueous adhesive compositions may be used as adhesives for adhering polymeric roofing membranes to roofing substrates, such as wood roof sheathing materials. The latex emulsion includes an aqueous carrier liquid and a first latex copolymer or stage preferably formed from reactants that include a vinyl monomer having an alkyl group including at least 2 carbon atoms, such as at least 3 carbon atoms, or at least 4 carbon atoms. Typically, the alkyl group including at least 2 carbons has less than 20 carbons, less than 15 carbons, or less than 12 carbons. In some examples, the vinyl monomer may include an alkyl group that includes between 2 and 20 carbon atoms. The vinyl monomer may optionally and preferably include

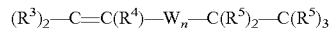

wherein $R^3$ is independently selected from hydrogen or an organic group (typically at least one and more typically both $R^3$ are hydrogen atoms); $R^4$ is selected from hydrogen or an alkyl group (e.g., a methyl group); W, if present, is a divalent linking group (e.g., an ester bond of either directionality: —C(C═O)— or —(C═O)C—); n is 0 or 1, more typically 1; and each $R^5$ is independently hydrogen, a linear alkyl group, or a branched alkyl group. A homopolymer formed from the vinyl monomer preferably exhibits a glass transition temperature between about −10° C. and about 30° C., or between about −7° C. and about 25° C., or between about −7° C. and about 20° C. For example, the glass transition temperature of n-butyl methacrylate is about 20° C., the glass transition temperature of VeoVa 10 is about −3° C., and the glass transition temperature of 2-ethylhexyl methacrylate is about −6° C.

The value of the glass transition temperature is based on literature values. Typically, there is some variation of the glass transition temperature values of the homopolymers of monomers listed in such literature. For example, the glass transition temperature of the homopolymer of 2-ethyl hexyl acrylate has various literature values from −55° C. to −85° C. The difference arises from the test method used to measure the glass transition temperature. For the purposes of this disclosure, the values used for the homopolymer glass transition temperature of certain monomers, particularly monomers used in the examples, are listed herein. Alternatively, the method of determining the glass transition temperature of a homopolymer can be determined using the DSC procedure described herein, particularly if the literature values are significantly different (e.g., the literature values vary by at least 15° C.).

In some examples, the alkyl group may include one or more heteroatoms. In other examples, the alkyl group is unsubstituted. The alkyl group may include or consist of a cycloalkyl, or, in some preferred examples, may exclude a cycloalkyl group.

In some examples, the vinyl monomer having an alkyl group including between 2 and 20 carbon atoms may include or consist of laurel methacrylate, n-butyl methacrylate, iso-butyl methacrylate, t-butyl methacrylate, sec-butyl methacrylate, 2-ethylhexyl methacrylate, VeoVa™ 10, or combinations thereof. VeoVa™ 10 is a monomer available from HEXION™ Inc., Columbus, Ohio, and is a vinyl ester of neodecanoic acid, a synthetic saturated monocarboxylic acid with a highly branched structure containing ten carbon atoms. VeoVa™ 10 is represented by the formula: $-CH_2=CH_2-O-(C=O)-C(R^1)(R^2)CH_3$, where $R^1$ and $R^2$ are alkyl groups containing a total of 7 carbon atoms. In some examples, the vinyl monomer having an alkyl group including between 2 and 20 carbon atoms includes or consists of n-butyl methacrylate or a mixture of n-butyl methacrylate and 2-ethylhexyl methacrylate.

In some examples, the latex emulsion is used alone as the adhesive. In other examples, the latex emulsion may be used in combination with one or more additives, such as a dispersant, a biocide, a fungicide, an UV stabilizer, a thickener, a wetting agent, a defoamer, a filler, a pigment or colorant, a tackifier, or combinations thereof, to form an aqueous adhesive composition.

In some examples, the latex copolymer may be a single-stage latex copolymer made using the reactants described above. The latex copolymer may be used alone or may be combined (e.g., mechanically mixed) with a second latex copolymer. The second latex copolymer may include a (meth)acrylate monomer other than the vinyl monomer used in the first latex copolymer. For example, the second latex copolymer may include a (meth)acrylate monomer other than butyl methacrylate. It should be understood, however, that butyl methacrylate may be included (and in various examples is included) in the second latex copolymer in addition to the (meth)acrylate other than butyl methacrylate. It should also be understood that the terms "first" and "second" as used herein (e.g., in the context of first and second reactants or first and second copolymers or stages) are not intended to indicate any specific temporal or spatial ordering unless explicitly indicated as such. While not wishing to be bound by theory, it has been discovered that the second latex copolymer may synergistically improve adhesion to the TPO or EPDM rubber membranes compared to only the first latex copolymer or only the second latex copolymer. While not wishing to be bound by theory, currently available evidence suggests that the second latex copolymer may improve cohesive strength of the film formed from the adhesive composition, may affect an effective glass transition temperature of the film formed from the adhesive composition, and/or may affect a weight average molecular weight of the solids components in film formed from the adhesive composition.

In some examples, rather than being a mechanical mixture of two different latex copolymers, the latex emulsion or aqueous adhesive composition may include a multi-stage latex that includes, for example, a first stage formed from the reactants used to form the first latex copolymer or stage and a second stage formed from the reactants used to form the second latex copolymer or stage. The first and second stages may be formed in either order (e.g., the first stage may be formed first and the second stage formed second, or the second stage may be formed first and the first stage formed second).

The latex emulsion or aqueous adhesive composition may be applied directly to polymeric roofing membranes, such as TPO membranes, EPDM rubber membranes, or PVC membranes. The coatings preferably exhibit desirable dry adhesion to the polymeric roofing membranes, e.g., a dry adhesion to TPO and a plywood roofing substrate of greater than about 4 pound per linear inch (about 0.714 kilograms per linear centimeter) when tested as described herein. In some examples, the coatings formed on TPO using the latex emulsion or aqueous coating composition preferably exhibits a dry adhesion to TPO and a plywood roofing substrate of greater than about 6 pounds per linear inch (about 1.0714 kilograms per linear centimeter) or greater than about 8 pounds per linear inch (about 1.429 kilograms per linear centimeter) when tested as described herein.

In this way, the latex emulsions and aqueous adhesive compositions including the latex emulsion may be used as an adhesive for installing polymeric roofing membranes, such as TPO membranes, EPDM rubber membranes, or PVC membranes. The latex emulsions and aqueous adhesive compositions may provide one or more benefits compared to two-component epoxies, such as lower volatile organic content (VOC), lower cost, relatively longer potlife, or relatively easier handling due to single component nature of the latex emulsions and aqueous adhesives compositions. In some examples, the single stage latex copolymer, mixture of first and second latex copolymers, or multi-stage latex copolymer may be dried to powder form and used as an adhesive, rather than being used in emulsion form.

The latex emulsions described herein for use in adhesives preferably include an aqueous carrier liquid and a first latex copolymer or stage. In some examples, the first latex copolymer or stage is an emulsion polymerized latex copolymer. The reactants that form the first latex copolymer or stage may include a vinyl monomer having an alkyl group including between 2 and 20 carbon atoms, preferably between 3 and 15 carbon atoms, more preferably between 2 and 12 carbon atoms. The vinyl monomer may include any monomer consistent with the definition and examples presented above. In some examples, the vinyl monomer includes a methacrylate. As used herein, a methacrylate having an alkyl group including between X and Y carbon atoms (e.g., between 2 and 20 carbon atoms) refers to a methacrylate having the following formula, where the $R_2$ group is the alkyl group including between X and Y carbon atoms and $R_1$ is a methyl group: $H_2C=C(R_1)C(=O)OR_2$. The alkyl group may include a linear alkyl group, a branched alkyl group, a cycloalkyl group, or an unsaturated alkyl group. In some examples, the alkyl group may exclude a cycloalkyl group. For example, the methacrylate may include or consist of laurel methacrylate, n-butyl methacrylate, iso-butyl methacrylate, t-butyl methacrylate, sec-butyl methacrylate, 2-ethylhexyl methacrylate, or the like, or combinations thereof. In some examples, the methacrylate includes or consists of n-butyl methacrylate or a mixture of n-butyl methacrylate and 2-ethylhexyl methacrylate.

The reactants used to form the first latex copolymer or stage may include at least 20 wt. % of the vinyl monomer having an alkyl group including between 2 and 20 carbon atoms, based on the total weight of ethylenically unsaturated monomers used to make the first latex copolymer or stage. As used herein, "based on the total weight of ethylenically unsaturated monomers used to make the first latex copolymer or stage" refers to a basis of the total amount of monomer used to form the first latex copolymer or stage. In some examples, the reactants include at least about 25 wt. % of the vinyl monomer having an alkyl group including between 2 and 20 carbon atoms, based on the total weight of ethylenically unsaturated monomers used to make the first latex copolymer or stage; or at least about 30 wt. % of the vinyl monomer having an alkyl group including between 2 and 20 carbon atoms, based on the total weight of ethylenically unsaturated monomers used to make the first latex copolymer or stage; or at least about 50 wt. % of the vinyl monomer having an alkyl group including between 2 and 20 carbon atoms, based on the total weight of ethylenically unsaturated monomers used to make the first latex copolymer or stage. In some examples, the reactants used to form the first latex copolymer or stage may include less than about 99 wt. % of the vinyl monomer having an alkyl group including between 2 and 20 carbon atoms, based on the total weight of ethylenically unsaturated monomers used to make the first latex copolymer or stage; or less than about 75 wt. % of the vinyl monomer having an alkyl group including between 2 and 20 carbon atoms, based on the total weight of ethylenically unsaturated monomers used to make the first latex copolymer or stage; or less than about 60 wt. % of the vinyl monomer having an alkyl group including between 2 and 20 carbon atoms, based on the total weight of ethylenically unsaturated monomers used to make the first latex copolymer or stage; or less than about 55 wt. % of the vinyl monomer having an alkyl group including between 2 and 20 carbon atoms, based on the total weight of ethylenically unsaturated monomers used to make the first latex copolymer or stage. In some examples, the first latex copolymer or stage includes between about 20 and about 55 wt. % of the vinyl monomer having an alkyl group including between 2 and 20 carbon atoms, based on the total weight of ethylenically unsaturated monomers in the first latex copolymer or stage.

In some examples, the reactants that form the first latex copolymer or stage also include an ethylenically unsaturated polar monomer. For example, the ethylenically unsaturated polar monomer may include an ethylenically unsaturated monomer including at least one alcohol group, an ethylenically unsaturated ionic monomer, an at least partially neutralized ethylenically unsaturated ionic monomer, or the like. The at least partially neutralized ethylenically unsaturated ionic monomer may be a salt form of the ethylenically unsaturated ionic monomer, and the salt form may be formed prior to, during, or after reaction of the ethylenically unsaturated ionic monomer with the other monomers in the reactants to form the latex copolymer.

In some examples, the ethylenically unsaturated polar monomer may include an acid- or anhydride-functional ethylenically unsaturated monomer or an at least partially neutralized acid- or anhydride-functional ethylenically unsaturated monomer. For example, the ethylenically unsaturated polar monomer may include acrylic acid, methacrylic acid, crotonic acid, fumaric acid, maleic acid, 2-methyl maleic acid, itaconic acid, 2-methyl itaconic acid, anhydride variants thereof, at least partially neutralized variants thereof, or combinations thereof.

The reactants used to form the first latex copolymer or stage may include at least about 0.1 wt. % of the ethylenically unsaturated polar monomer, based on the total weight of ethylenically unsaturated monomers used to make the first latex copolymer or stage; or greater than about 0.5 wt. % of the ethylenically unsaturated polar monomer, based on the total weight of ethylenically unsaturated monomers used to make the first latex copolymer or stage; or greater than about 1 wt. % of the ethylenically unsaturated polar monomer, based on the total weight of ethylenically unsaturated monomers used to make the first latex copolymer or stage. In some examples, the reactants include less than about 10 wt. % of the ethylenically unsaturated polar monomer, based on the total weight of ethylenically unsaturated monomers used to make the first latex copolymer or stage; or less than about 5 wt. % of the ethylenically unsaturated polar monomer, based on the total weight of ethylenically unsaturated monomers used to make the first latex copolymer or stage; or less than about 3 wt. % of the ethylenically unsaturated polar monomer, based on the total weight of ethylenically unsaturated monomers used to make the first latex copolymer or stage.

The reactants that form the first latex copolymer or stage also may include a chain transfer agent. In some examples, the reactants include at least about 0.1 wt. % of the chain transfer agent, based on the total weight of ethylenically unsaturated monomers used to make the first latex copolymer or stage; or at least about 0.25 wt. % of the chain transfer agent, based on the total weight of ethylenically unsaturated monomers in the first latex copolymer or stage; or at least about 0.5 wt. % of the chain transfer agent, based on the total weight of ethylenically unsaturated monomers used to make the first latex copolymer or stage. In some examples, the reactants may include less than about 2 wt. % of the chain transfer agent, based on the total weight of ethylenically unsaturated monomers used to make the first latex copolymer or stage; or less than about 1 wt. % of the chain transfer agent, based on the total weight of ethylenically unsaturated monomers in the first latex copolymer or stage; or less than about 0.75 wt. % of the chain transfer agent, based on the total weight of ethylenically unsaturated monomers used to make the first latex copolymer or stage. The chain transfer agent may include any suitable chain transfer agent, such as a thiol. In some examples, the chain transfer agent includes or consists of a mercaptan, such as dodecyl mercaptan.

In some examples, the reactants used to form the first latex copolymer or stage optionally include another monomer. Suitable additional monomers include, for example, methyl acrylate, ethyl acrylate, propyl acrylate, butyl acrylate, 2-ethylhexyl acrylate, methyl methacrylate, ethyl methacrylate, propyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth) acrylamide, styrene, α-methyl styrene, vinyl toluene, vinyl acetate, vinyl propionate, allyl methacrylate, and mixtures thereof. Some preferred monomers include styrene, methyl methacrylate, methacrylic acid, acetoacetoxy ethyl methacrylate, butyl acrylate, and the like. The additional monomer(s) may be selected to reduce a glass transition temperature ($T_g$) of the latex copolymer. Thus, the additional monomer(s) may have a homopolymer $T_g$ that is less than the homopolymer $T_g$ of the methacrylate having the alkyl group including between 2 and 20 carbon atoms. For example, the additional monomer(s) may have a homopolymer $T_g$ that is less than −25° C., or less than about −35° C., or less than about −50° C. In some implementations, the additional monomer(s) includes or consists of an alkyl acrylate, such as 2-ethylhexyl acrylate. When present, the reactants used to form the first latex copolymer or stage may include at least about 10 wt. % of the additional monomer(s), based on the total weight of ethylenically unsaturated monomers used to make the first latex copolymer or stage; or at least about 20 wt. % of the additional monomer(s), based on the total weight of ethylenically unsaturated monomers used to make the first latex copolymer or stage; or at least about 30 wt. % of the additional monomer(s), based on the total weight of ethylenically unsaturated monomers in the first latex copolymer or stage. In some examples, the reactants used to form the first latex copolymer or stage may include less than about 80 wt. % of the additional monomer(s), based on the total weight of ethylenically unsaturated monomers used to make the first latex copolymer or stage; or less than about 60 wt. % of the additional monomer(s), based on the total weight of ethylenically unsaturated monomers used to make the first latex copolymer or stage; or less than about 50 wt. % of the additional monomer(s), based on the total weight of ethylenically unsaturated monomers used to make the first latex copolymer or stage.

In some examples, the reactants used to form the first latex copolymer or stage further include a ureido-functional monomer. The ureido-functional monomer may affect adhesion of the latex copolymer to substrates, including polymeric roofing membrane substrates. In some examples, the ureido-functional monomer includes a ureido-functional ethylenically unsaturated monomer, such as a ureido-functional methacrylic monomer. Example ureido-functional ethylenically unsaturated monomers include those available under the trade designations SIPOMER® WAM and SIPOMER® WAM II available from Solvay S.A., Brussels, Belgium, and VISIOMER® MEEU 25 M from Evonik Industries, Essen, Germany.

In some examples, the reactants used to form the first latex copolymer or stage further include a seed latex. The seed latex may function as a polymerization growth site and may affect a final particle size of the first latex copolymer.

The first latex copolymers disclosed above may, in some examples, be formed and/or stabilized with one or more emulsifiers (e.g., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether. Examples of suitable ionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium salts of phosphate esters of ethoxylated nonylphenol or tridecyl alcohol, potassium salts of phosphate esters of ethoxylated nonylphenol or tridecyl alcohol, ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxy ethyl)-N-octadecylsulfosuccinamate, disodium N-octadecyl sulfosuccinamate, disodium alkylamido poly-ethoxy sulfosuccinate, disodium ethoxylated nonylphenol half ester of sulfosuccinic acid, the sodium salt of tert-octylphenoxyethoxypoly(39)ethoxyethyl sulfate, and combinations thereof.

The first latex copolymer or stage may be polymerized using chain growth polymerization. One or more water-soluble free radical initiators may be used in the chain growth polymerization. Initiators suitable for use in the latex emulsion will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to about 3 wt. %, based on the total weight of ethylenically unsaturated monomers used to make the first latex copolymer or stage. In a redox system the amount of reducing agent is preferably from 0.01 to 3 wt. %, based on the total weight of ethylenically unsaturated monomers used to make the first latex copolymer or stage. The polymerization reaction can be performed at, for example, a temperature in the range of from about 10° C. to about 100° C.

The first latex copolymer may exhibit a measured glass transition temperature of less than about −10° C., or less than about −15° C., or less than about −20° C. In some examples, the first latex copolymer exhibits a measured glass transition temperature of greater than about −50° C., or greater than about −40° C., or greater than about −30° C. For example, the first latex copolymer may exhibit a measured glass transition temperature of between about −50° C. and about −20° C. The glass transition temperature may be measured by air drying a sample overnight and analyzing the dried sample on a Q2000 DSC from TA Instruments using a heat-cool-heat cycle from −75° C. to 150° C. at a rate of 20° C. per minute. The glass transition temperature was measured from the midpoint of the transition on the second heat cycle.

In some examples, the first latex copolymer may include both soluble and insoluble fractions. A gel fraction of the first latex copolymer may be determined by soaking a sample of air-dried latex copolymer in a porous bag or pouch in a solvent, such as tetrahydrofuran (THF). The gel fraction is determined as the final weight of the sample (after drying) divided by the initial weight of the sample (after drying). A more detailed description of a suitable methodology is provided in the examples section. In some examples, the first latex copolymer may exhibit a gel fraction of between 0% and about 10%, or between 0% and about 5%, or between 0% and about 3.5%, or between about 1.0% and about 3.5%.

The solubilized portion of the first latex copolymer from the gel fraction test preferably exhibits a weight average molecular weight. In some examples, the weight average molecular weight may be less than about 300,000 g/mol. In other examples, the weight average molecular weight may be less than about 230,000 g/mol, or less than about 200,000 g/mol. In some examples, the weight average molecular weight may be greater than about 50,000 g/mol, or between about 50,000 g/mol and about 230,000 g/mol, or between about 50,000 and about 200,000 g/mol. The weight average molecular weight may be determined as described below in Chain Transfer Agent Series Example 1.

The first latex copolymer may exhibit any volume average particle size, as the average particle size is not believed to be important. In some examples, the first latex copolymer may exhibit any volume average particle size of between about 150 nm and about 550 nm. The volume average particle size may be determined using a Nanotrac Wave II particle size analyzer from Microtrac Inc., Montgomeryville, Pennsylvania.

In some examples, the latex emulsion or aqueous adhesive composition may include a total solids content of between about 50% and about 60%, or about 55%.

The latex emulsion may exhibit a viscosity suitable for application of the latex emulsion, either alone or in combination with one or more additives in an adhesive composition, to a substrate using typical coating application techniques, such as rolling, brushing, dipping, spraying, or the like.

In some examples, as mentioned above, instead of including only the first latex copolymer or stage, the latex emulsion may include a combination (e.g., mechanical mixture) of the first latex copolymer (described above) and a second, different latex copolymer, or may include a multi-stage latex copolymer including a first stage that is the first latex copolymer described above and a second, different stage. The second latex copolymer or stage may be formed from reactants including an ethylenically unsaturated polar monomer and a (meth)acrylate other than the vinyl monomer in the first latex copolymer or stage (e.g., butyl methacrylate). The ethylenically unsaturated polar monomer may include any suitable ethylenically unsaturated polar monomer, at least partially neutralized ethylenically unsaturated polar monomer, or anhydride form of an ethylenically unsaturated polar monomer. For example, the ethylenically unsaturated polar monomer may include any of those described above with respect to the single-stage latex copolymer, including acrylic acid, methacrylic acid, an at least partially neutralized acrylic acid, an at least partially neutralized methacrylic acid.

The (meth)acrylate other than the vinyl monomer in the first latex copolymer or stage (e.g., butyl methacrylate) may include any suitable (meth)acrylate. Suitable additional monomer(s) include, for example, methyl acrylate, ethyl acrylate, propyl acrylate, butyl acrylate, 2-ethylhexyl acrylate, methyl methacrylate, ethyl methacrylate, propyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), allyl methacrylate, and mixtures thereof. For example, the (meth)acrylate other than the vinyl monomer in the first latex copolymer or stage (e.g., butyl methacrylate) may include butyl acrylate or a mixture of butyl acrylate and methyl methacrylate.

It should be understood, however, that butyl methacrylate may be included (and in various examples is included) in the second latex copolymer or stage in addition to the (meth) acrylate other than the vinyl monomer in the first latex copolymer or stage (e.g., butyl methacrylate).

In some examples, the reactants used to form the second latex copolymer or stage may include a chain transfer agent, including any suitable chain transfer agent described herein, such as a mercaptan.

The reactants used to form the second latex copolymer or stage may optionally include one or more additional (meth) acrylate. The one or more additional (meth)acrylate may include, for example, an alkyl acrylate, such as 2-ethylhexyl acrylate.

The reactants used to form the second latex copolymer or stage optionally may include one or more of the surfactants described above, one or more of the initiators described above, one or more of the ureido-functional ethylenically unsaturated monomers described above, or combinations thereof.

In examples that employ separate first and second latex copolymers, the first and second latex copolymers may be mechanically mixed in any suitable proportion, based on total resin solids. For example, the first and second latex copolymers may be mechanically mixed in a weight ratio (first latex copolymer: second latex copolymer) between about 4:1 and about 1:4, or between about 3:1 and about 1:3, or between about 2:1 and about 1:2, or about 1:1. Similarly, in examples that employ multiple latex stages, the multi-stage latex copolymer may include first stage and second stage weight content in any suitable proportion, such as between about 4:1 and about 1:4, or between about 3:1 and about 1:3, or between about 2:1 and about 1:2, or about 1:1.

While not wishing to be bound by theory, the second latex copolymer may synergistically improve adhesion to the polymeric membranes (such as TPO membranes, EPDM rubber membranes, PVC membranes, or the like) compared to only the first latex copolymer or only the second latex copolymer. While not wishing to be bound by theory, currently available evidence suggests that the second latex copolymer may improve cohesive strength of the film formed from the adhesive composition, may affect an effective glass transition temperature of the film formed from the adhesive composition, and/or may advantageously affect a weight average molecular weight of the solids components in film formed from the adhesive composition. Similarly, in multi-stage latexes that employ suitable first and second emulsion polymerized stages disclosed herein, it is believed that the multi-stage latex architecture can provide similar benefits, as described above, compared to a single stage latex copolymer including only the first stage or the second stage alone.

The latex emulsion may be used an adhesive, e.g., to join a roofing membrane to a roofing substrate. For example, the latex emulsion may be used to adhere thermoplastic polyolefin (TPO) membranes, ethylene propylene diene monomer (EPDM) rubber membranes, or the like to a substrate, such as roof sheathing material. The roof substrate material may include, for example, any suitable wood product, including plywood, particle board, oriented strand board, or the like. The TPO and EPDM membranes may be used as roofing materials. The latex emulsion may be applied directly to roof substrate or the TPO or EPDM membrane and preferably exhibits desirable dry adhesion to the TPO or EPDM membrane. For example, a coating formed from the latex emulsion preferably exhibits a dry adhesion to TPO and a plywood roofing substrate of greater than about 4 pounds per linear inch (about 0.714 kilograms per linear centimeter), or greater than about 6 pounds per linear inch (about 1.0714 kilograms per linear centimeter), or greater than about 8 pounds per linear inch (about 1.429 kilograms per linear centimeter), or greater than about 10 pounds per linear inch (about 1.786 kilograms per linear centimeter). Dry adhesion may be tested according to the following procedure, referred to herein as a "dry adhesion testing procedure." A 2"×12" (about 5.08 cm×30.48 cm) strip of 45-mil (about 1.143 mm) thick TPO (available under the trade designation EVERGUARD® TPO 45-mil Membrane from GAF Parsippany, New Jersey) was placed onto a ½"×4"×6" (about 1.27 cm×10.16 cm×15.24 cm) CDX plywood panel. The outline of the TPO may be traced on the CDX plywood panel using a "Sharpie" or equivalent writing utensil thereby creating a 12 in$^2$ (about 77.42 cm$^2$) test area. The CDX plywood panel was placed on a scale and the weight tared. 3.4 grams of the adhesive was applied and uniformly spread over the 12 in$^2$ (about 77.42 cm$^2$) test area using a ¹⁄₁₆"-notched spreader (about 0.15875 cm-notched spreader). This coat weight was about 6 lbs/100 ft$^2$ (about 0.2929 kg/m$^2$). The TPO membrane was laid on the wet adhesive and gently pressed into the adhesive without causing the adhesive to ooze out of the sides. The construction was turned over such that the TPO membrane was facing down and placed on a piece of silicone release liner. A 500 g weight was placed in the center of the plywood test panel. The construction was allowed to dwell at room temperature for 24 hours to dry. Once the dry time is complete, one end of the panel was placed in the bottom clamp of the MTS Insight® tensile tester, the unattached end of the TPO membrane was folded over and placed in the upper clamp of the tensile tester. The TPO membrane strip was peeled using the MTS Insight® tensile tester at a 180° angle and a pull rate of 2 inches/minute (about 5.08 cm/minute) for the entire length of the test area. This allows measurement of adhesion with units of pounds per linear inch or equivalent units.

In some examples, rather than being used neat, the latex emulsion may be part of an aqueous adhesive composition that includes at least one additive. The at least one additive may include, for example, a dispersant, a biocide, a fungicide, an UV stabilizer, a thickener, a wetting agent, a defoamer, a filler, a pigment or colorizer, a tackifier, or combinations thereof.

The aqueous adhesive composition may contain one or more optional ingredients that are or contain VOCs. Such ingredients will be known to persons having ordinary skill in the art or can be determined using standard methods. Desirably the adhesive compositions are low VOC, and preferably include not more than 150 g VOC/L composition excluding exempt solvent weight (about 15% w/v) by U.S.A. EPA Method 24, preferably not more than about 100 g/L (about 10% w/v), more preferably not more than about 50 g VOC/L composition (about 5% w/v), and most preferably not more than 20 g VOC/L composition (about 2% w/v), for example not more than about 10 g VOC/L composition (about 1% w/v) or not more than about 8 g VOC/L composition (about 0.8% w/v) volatile organic compounds.

The aqueous adhesive composition may contain one or more optional coalescents to facilitate film formation. Coalescents suitable for use in the adhesive compositions will be known to persons having ordinary skill in the art or can be determined using standard methods. Exemplary coalescents include glycol ethers such as those sold under the trade names EASTMAN™ EP, EASTMAN™ DM, EASTMAN™ DE, EASTMAN™ DP, EASTMAN™ DB and EASTMAN™ PM from Eastman Chemical Company, Kingsport, Tennessee, and ester alcohols such as those sold under the trade name TEXANOL™ ester alcohol from Eastman Chemical Company. The optional coalescent may be a low VOC coalescent such as is described in U.S. Pat. No. 6,762,230 B2. The adhesive compositions may include a low VOC coalescent in an amount of at least about 0.5 wt. %, or at least about 1 wt. %, and or at least about 2 wt. %, based on a total non-volatile weight of the latex copolymer. The adhesive compositions also may include a low VOC coalescent in an amount of less than about 10 wt. %, or less than about 6 wt. %, or less than about 4 wt. %, based on a total non-volatile weight of the latex copolymer.

Other optional additives for use in the aqueous adhesive compositions herein are described in Koleske et al., Paint and Coatings Industry, April 2003, pages 12-86. Some performance enhancing additives that may optionally be employed include coalescing solvent(s), defoamers, dispersants, amines, preservatives, biocides, mildewcides, fungicides, glycols, surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, external crosslinkers, and the like to modify properties of the aqueous adhesive composition.

The disclosed adhesive compositions may include a surface-active agent (e.g., surfactant) that modifies the interaction of the adhesive composition with the substrate. The surface-active agent affects qualities of the aqueous adhesive composition including how the aqueous adhesive composition is handled, how it spreads across the surface of the substrate, and how it bonds to the substrate. The surface-active agent can modify the ability of the aqueous adhesive composition to wet a substrate and also may be referred to as a wetting agent. Surface-active agents may also provide leveling, defoaming, or flow control properties, and the like. If the aqueous adhesive composition includes a surface-active agent, the surface-active agent is preferably present in an amount of less than 5 wt. %, based on the total weight of the aqueous adhesive composition. Surface-active agents suitable for use in the adhesive composition will be known to persons having ordinary skill in the art or can be determined using standard methods. Some suitable surface-active agents include those available under the trade designations STRODEX™ KK-95H, STRODEX™ PLF100, STRODEX™ PKOVOC, STRODEX™ LFK70, STRODEX™ SEK50D and DEXTROL™ 0050 from Dexter Chemical L.L.C., Bronx, New York; HYDROPALAT™ 100, HYDROPALAT™ 140, HYDROPALAT™ 44, HYDROPALAT™ 5040 and HYDROPALAT™ 3204 from Cognis Corporation, Cincinnati, Ohio; LIPOLIN™ A, DISPERS™ 660C, DISPERS™ 715W and DISPERS™ 750W from Degussa Corporation, Parsippany, New Jersey; BYK™ 156, BYK™ 2001 and ANTI-TERRA™ 207 from Byk Chemie, Wallingford, Connecticut; DISPEX™ A40, DISPEX™ N40, DISPEX™ R50, DISPEX™ G40, DISPEX™ GA40, EFKA™ 1500, EFKA™ 1501, EFKA™ 1502, EFKA™ 1503, EFKA™ 3034, EFKA™ 3522, EFKA™ 3580, EFKA™ 3772, EFKA™ 4500, EFKA™ 4510, EFKA™ 4520, EFKA™ 4530, EFKA™ 4540, EFKA™ 4550, EFKA™ 4560, EFKA™ 4570, EFKA™ 6220, EFKA™ 6225, EFKA™ 6230 and EFKA™ 6525 from Ciba Specialty Chemicals, Tarrytown, New York; SURFYNOL™ CT-111, SURFYNOL™ CT-121, SURFYNOL™ CT-131, SURFYNOL™ CT-211, SURFYNOL™ CT 231, SURFYNOL™ CT-136, SURFYNOL™ CT-151, SURFYNOL™ CT-171, SURFYNOL™ CT-234, CARBOWET™ DC-01, SURFYNOL™ 104, SURFYNOL™ PSA-336, SURFYNOL™ 420, SURFYNOL™ 440, ENVIROGEM™ AD-01 and ENVIROGEM AE01 from Air Products & Chemicals, Inc., Allentown, Pennsylvania; TAMOL™ 1124, TAMOL 850, TAMOL 681, TAMOL™ 731 and TAMOL™ SG-1 from Rohm and Haas Co., Philadelphia, Pennsylvania;

IGEPAL™ CO-210, IGEPAL™ CO-430, IGEPAL™ CO-630, IGEPAL™ CO-730, and IGEPAL™ CO-890 from Rhodia Inc., Cranbury, New Jersey; T-DET™ and T-MULZ™ products from Harcros Chemicals Inc., Kansas City, Kentucky; polydimethylsiloxane surface-active agents (such as those available under the trade designations SILWET™ L-760 and SILWET™ L-7622 from OSI Specialties, South Charleston, West Virginia, or BYK™ 306 from Byk-Chemie) and fluorinated surface-active agents (such as that commercially available as FLUORAD™ FC-430 from 3M Co., St. Paul, Minnesota).

In some examples, the surface-active agent may be a defoamer. Some suitable defoamers include those sold under the trade names BYK™ 018, BYK™ 019, BYK$^{TM}$ 020, BYK™ 022, BYK™ 025, BYK™ 032, BYK™ 033, BYK™ 034, BYK™ 038, BYK™ 040, BYK™ 051, BYK™ 060, BYK™ 070, BYK™ 077 and BYK™ 500 from Byk Chemie; SURFYNOL™ DF-695, SURFYNOL™ DF-75, SURFYNOL™ DF-62, SURFYNOL™ DF-40 and SURFYNOL™ DF-110D from Air Products & Chemicals, Inc.; DEEFO™ 3010A, DEEFO™ 2020E/50, DEEFO™ 215, DEEFO™ 806-102 and AGITAN™ 31BP from Munzing Chemie GmbH, Heilbronn, Germany; EFKA 2526, EFKA 2527 and EFKA 2550 from Ciba Specialty Chemicals; FOAMAX™ 8050, FOAMAX™ 1488, FOAMAX™ 7447, FOAMAX™ 800, FOAMAX™ 1495 and FOAMAX 810 from Degussa Corp.; FOAMASTER™ 714, FOAMASTER™ A410, FOAMASTER™ 111, FOAMASTER™ 333, FOAMASTER™ 306, FOAMASTER™ SA-3, FOAMASTER™ AP, DEHYDRAN™ 1620, DEHYDRAN™ 1923 and DEHYDRAN™ 671 from Cognis Corp.

The aqueous adhesive composition also may contain one or more optional external crosslinkers. External crosslinkers may improve tensile strength of a coating formed from the aqueous adhesive composition. Example external crosslinkers include silanes, zinc oxide pigments, nanozinc, ZINPLEX 15 (available from Munzing, Bloomfield, New Jersey), and the like.

The aqueous adhesive composition also may contain one or more optional pigments. Pigments suitable for use in the adhesive compositions will be known to persons having ordinary skill in the art or can be determined using standard methods. Some suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The aqueous adhesive composition can also include a gloss control additive or an optical brightener, such as that commercially available under the trade designation UVITEX™ OB from Ciba-Geigy.

In some examples, the aqueous adhesive composition may include an optional filler or inert ingredient. Fillers or inert ingredients extend, lower the cost of, alter the appearance of, or provide desirable characteristics to the aqueous adhesive composition before and after curing. Fillers and inert ingredients suitable for use in the aqueous adhesive composition will be known to persons having ordinary skill in the art or can be determined using standard methods. Some suitable fillers or inert ingredients include, for example, clay, glass beads, calcium carbonate, talc, silicas, feldspar, mica, barytes, ceramic microspheres, calcium metasilicates, organic fillers, and the like. Suitable fillers or inert ingredients are preferably present in an aggregate amount of less than 15 wt. %, based on the total weight of the aqueous adhesive composition.

In certain applications it may also be desirable to include in the aqueous adhesive composition a biocide, fungicide, or the like. Some suitable biocides or fungicides include those sold under the trade names ROZONE™ 2000, BUSAN™ 1292 and BUSAN 1440 from Buckman Laboratories, Memphis, Tennessee; POLYPHASE™ 663 and POLYPHASE™ 678 from Troy Chemical Corp., Florham Park, New Jersey; and KATHON™ LX from Rohm and Haas Co.

The aqueous adhesive composition may also include other ingredients that modify properties of the aqueous adhesive composition as it is stored, handled, or applied, and at other or subsequent stages. Waxes, flatting agents, rheology control agents, mar and abrasion additives, and other similar performance enhancing additives may be employed as needed in amounts effective to upgrade the performance of the cured adhesive and the aqueous adhesive composition. Some suitable wax emulsions to improve adhesive physical performance include those sold under the trade names MICHEM™ Emulsions 32535, 21030, 61335, 80939M and 7173MOD from Michelman, Inc. Cincinnati, Ohio and CHEMCOR™ 20N35, 43A40, 950C25 and 10N30 from ChemCor of Chester, New York. Some suitable rheology control agents include those sold under the trade names RHEOVIS™ 112, RHEOVIS™ 132, RHEOVIS™, VISCALEX™ HV30, VISCALEX™ AT88, EFKA™ 6220 and EFKA™ 6225 from Ciba Specialty Chemicals; BYK™ 420 and BYK™ 425 from Byk Chemie; RHEOLATE™ 205, RHEOLATE™ 420 and RHEOLATE™ 1 from Elementis Specialties, Hightstown, New Jersey; ACRYSOL™ L TT-615, ACRYSOL™ RM-5, ACRYSOL™ RM-6, ACRYSOL™ RM-8W, ACRYSOL™ RM-2020 and ACRYSOL™ RM-825 from Rohm and Haas Co.; NATROSOL™ 250LR from Hercules Inc., Wilmington, Delaware and CELLOSIZE™ QP09L from Dow Chemical Co., Midland, Michigan Desirable performance characteristics of the adhesive include adhesion, chemical resistance, or combinations of these characteristics, and other similar characteristics.

In certain applications it may also be desirable to include in the aqueous adhesive composition an optional UV stabilizer. Concentration of the optional UV stabilizer in the aqueous coating composition will be known to persons having ordinary skill in the art or can be determined using standard methods. UV stabilizers may include encapsulated hydroxyphenyl-triazine compositions and other compounds known to persons having ordinary skill in the art, for example, TINUVIN™ 477DW, commercially available from BASF Corporation.

In some examples, the aqueous adhesive composition may optionally include a thickener. Thickeners may include hydroxyethyl cellulose; hydrophobically modified ethylene oxide urethane; processed attapulgite, a hydrated magnesium aluminosilicate; and other thickeners known to persons having ordinary skill in the art. For example, thickeners may include CELLOSIZE™ QP-09-L and ACRYSOL™ RM-2020NPR, available from Dow Chemical Company; and ATTAGEL™ 50, available from BASF Corporation. Concentration of the optional thickener stabilizer in the aqueous coating composition will be known to persons having ordinary skill in the art or can be determined using standard methods.

In some examples, the aqueous adhesive composition may optionally include a tackifier. In other examples, the aqueous adhesive composition may omit a tackifier, as the latex emulsion may provide sufficient adhesion to polymeric roofing membranes, such as TPO or EPDM rubber membranes, without a tackifier.

Like the latex emulsion, the aqueous adhesive composition may be used to adhere polymeric roofing membranes, such as TPO membranes, EPDM rubber membranes, or PVC membranes to substrates. FIG. 1 is a schematic, cross-sectional view of an article 10 that includes a substrate 12 coated with a latex-based adhesive 14 adhering a membrane 16 to substrate 12 in accordance with examples of this disclosure. For example, the aqueous adhesive composition may be used to adhere TPO membranes, EPDM rubber membranes, PVC membranes, or the like to substrate 12. Membrane 16 may include any suitable thickness for a roofing membrane, such as, for example, between about 0.5 mm and about 2.0 mm, or between about 1 and about 1.5 mm. The membranes may be used as roofing materials. Substrate 12 may include, for example, any suitable wood product, including plywood, particle board, oriented strand board, or the like. The latex emulsion or aqueous adhesive composition may be applied directly to substrate 12 or the polymeric roofing membrane and preferably exhibits desirable dry adhesion to the polymeric roofing membrane and a plywood roofing substrate. For example, coating 14 formed from the latex emulsion preferably exhibits a dry adhesion to TPO and a plywood roofing substrate of greater than about 4 pounds per linear inch, or greater than about 6 pounds per linear inch, or greater than about 8 pounds per linear inch, or greater than about 10 pounds per linear inch. The dry adhesion may be determined as described above.

Although the latex emulsions and aqueous adhesive compositions have been described as being used with roofing membranes, the latex emulsions and aqueous adhesive compositions may be used in other coating and adhesive applications. For example, the latex emulsions and aqueous adhesive compositions may be used as tie layers for adhering other coating layers (such as other latexes), tie layers for adhering two polymeric roofing membranes (such as one TPO roofing membrane to another TPO roofing membrane), an adhesive for adhering materials to relatively low surface energy substrates (e.g., substrates having a surface energy of less than about 40 dynes/cm, less than about 35 dynes/cm, less than about 30 dynes/cm, or less than about 25 dynes/cm) (e.g., for adhering plastic or paper labels to low-surface-energy polymers such as PVC, EPDM, polyolefins, or the like), a general purpose pressure sensitive adhesive, or the like.

Clause 1: A latex emulsion comprising: an aqueous carrier liquid; and a latex copolymer formed from reactants comprising butyl methacrylate, 2-ethylhexyl methacrylate, VeoVa™ 10, or combinations thereof, wherein the reactants comprise at least 20 wt. % of the butyl methacrylate, 2-ethylhexyl methacrylate, VeoVa™ 10, or combinations thereof, based on the total weight of ethylenically unsaturated monomers used to make the latex copolymer.

The latex emulsion of clause 1, wherein a coating formed from the latex emulsion optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

Clause 2: A latex emulsion comprising: an aqueous carrier liquid; a first latex copolymer or stage formed from first reactants comprising butyl methacrylate, 2-ethylhexyl methacrylate, VeoVa™ 10, or combinations thereof, wherein the first latex copolymer comprises at least 20 wt. % of the butyl methacrylate, 2-ethylhexyl methacrylate, VeoVa™ 10, or combinations thereof, based on the total weight of ethylenically unsaturated monomers used to make the first latex copolymer or stage; and a second latex copolymer or stage formed from second reactants comprising a (meth)acrylate monomer other than butyl methacrylate.

The latex emulsion of clause 2, wherein a coating formed from the latex emulsion optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

Clause 3: The latex emulsion of clause 2, wherein the second reactants further comprise a second chain transfer agent.

Clause 4: The latex emulsion of clause 2 or 3, wherein the first latex copolymer or stage is formed as an initial stage of a multi-stage latex and the second latex copolymer or stage is formed as a subsequent stage of the multi-stage latex.

Clause 5: The latex emulsion of clause 2 or 3, wherein the second latex copolymer or stage is formed as an initial stage of a multi-stage latex and the first latex copolymer or stage is formed as a subsequent stage of the multi-stage latex.

Clause 6: The latex emulsion of clause 2 or 3, wherein the first latex copolymer or stage and the second latex copolymer or stage are separate polymers mechanically mixed in the latex emulsion.

Clause 7: The latex emulsion of any one of clauses 2 to 6, wherein the first latex copolymer is chemically different from the second latex copolymer.

Clause 8: The latex emulsion of any one of clauses 2 to 7, wherein the (meth)acrylate monomer other than butyl methacrylate comprises butyl acrylate.

Clause 9: The latex emulsion of any one of clauses 2 to 7, wherein the (meth)acrylate monomer other than butyl methacrylate comprises a mixture of butyl acrylate and methyl methacrylate.

Clause 10: The latex emulsion of any one of clauses 1 to 9, wherein the reactants or the first reactants comprise at least 25 wt. % of the butyl methacrylate, 2-ethylhexyl methacrylate, VeoVa™ 10, or combinations thereof, based on the total weight of ethylenically unsaturated monomers used to make the latex copolymer or the first latex copolymer or stage.

Clause 11: The latex emulsion of any one of clauses 1 to 9, wherein the reactants or the first reactants comprise at least 30 wt. % of the butyl methacrylate, 2-ethylhexyl methacrylate, VeoVa™ 10, or combinations thereof, based on the total weight of ethylenically unsaturated monomers used to make the latex copolymer or the first latex copolymer or stage.

Clause 12: The latex emulsion of any one of clauses 1 to 9, wherein the reactants or the first reactants comprise at least 50 wt. % of the butyl methacrylate, 2-ethylhexyl methacrylate, VeoVa™ 10, or combinations thereof, based on the total weight of ethylenically unsaturated monomers used to make the latex copolymer or the first latex copolymer or stage.

Clause 13: The latex emulsion of any one of clauses 1 to 12, wherein the butyl methacrylate, 2-ethylhexyl methacrylate, VeoVa™ 10, or combinations thereof comprises a mixture of butyl methacrylate and ethylhexylmethacrylate.

Clause 14: The latex emulsion of any one of clauses 1 to 13, wherein the butyl methacrylate, 2-ethylhexyl methacrylate, VeoVa™ 10, or combinations thereof comprises n-butyl methacrylate.

Clause 15: The latex emulsion of any one of clauses 1 to 12, wherein the reactants or the first reactants comprise between about 20 and about 55 wt. % of the butyl methacrylate, 2-ethylhexyl methacrylate, VeoVa™ 10, or combinations thereof, based on the total weight of ethylenically unsaturated monomers used to make the latex copolymer or the first latex copolymer or stage.

Clause 16: An aqueous adhesive composition comprising: an aqueous carrier liquid; a dispersant, a biocide, a fungicide, an UV stabilizer, a thickener, a wetting agent, a defoamer, a filler, a pigment or colorant, a tackifier, or combinations thereof; and a latex copolymer formed from reactants comprising a vinyl monomer having an alkyl group including between 2 and 20 carbon atoms, wherein the reactants comprise at least 20 wt. % of the vinyl monomer having an alkyl group including between 2 and 20 carbon atoms, based on the total weight of ethylenically unsaturated monomers used to make the latex copolymer, and wherein a homopolymer formed from the vinyl monomer exhibits a glass transition temperature of between about −10° C. and about 30° C.

The aqueous adhesive composition of clause 16, wherein a coating formed from the aqueous adhesive composition optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

Clause 17: A method comprising: reacting reactants comprising a vinyl monomer having an alkyl group including between 2 and 20 carbon atoms to form a latex emulsion including a latex copolymer, wherein the reactants comprise at least 20 wt. % of the vinyl monomer having an alkyl group including between 2 and 20 carbon atoms, based on the total weight of ethylenically unsaturated monomers used to make the latex copolymer, wherein a homopolymer formed from the vinyl monomer exhibits a glass transition temperature of between about −10° C. and about 30° C.

The method of clause 17, wherein a coating formed from the latex emulsion optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

Clause 18: An aqueous adhesive composition comprising: an aqueous carrier liquid; a dispersant, a biocide, a fungicide, an UV stabilizer, a thickener, a wetting agent, a defoamer, a filler, a pigment or colorizer, a tackifier, or combinations thereof; a first latex copolymer or stage formed from first reactants comprising a vinyl monomer having an alkyl group including between 2 and 20 carbon atoms, wherein the reactants comprise at least 20 wt. % of the methacrylate having an alkyl group including between 2 and 20 carbon atoms, based on the total weight of ethylenically unsaturated monomers used to make the first latex copolymer or stage, and wherein a homopolymer formed from the vinyl monomer exhibits a glass transition temperature of between about −10° C. and about 30° C.; and a second latex copolymer or stage formed from second reactants comprising a (meth)acrylate monomer other than the vinyl monomer having an alkyl group including between 2 and 20 carbon atoms.

The aqueous adhesive composition of clause 18, wherein a coating formed from the aqueous adhesive composition optionally and preferably exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

Cause 19: A method comprising: reacting first reactants comprising a vinyl monomer having an alkyl group including between 2 and 20 carbon atoms to form a first latex copolymer or stage, wherein the first reactants comprise at least 20 wt. % of the vinyl monomer having an alkyl group including between 2 and 20 carbon atoms, based on the total weight of ethylenically unsaturated monomers used to make the first latex copolymer or stage, and wherein a homopolymer formed from the vinyl monomer exhibits a glass transition temperature of between about −10° C. and about 30° C.; and reacting second reactants comprising a (meth)acrylate monomer other than the vinyl monomer having an alkyl group including between 2 and 20 carbon atoms to form a second latex copolymer or stage.

The method of clause 19, wherein a coating formed from a latex emulsion including the first latex copolymer or stage and the second latex copolymer or stage optionally and preferably exhibits a dry adhesion of greater than about 4 pound per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

Clause 20: The aqueous adhesive composition or method of clause 18 or 19, wherein the first latex copolymer or stage is formed as an initial stage of a multi-stage latex and the second latex copolymer or stage is formed as a subsequent stage of the multi-stage latex.

Clause 21: The aqueous adhesive composition or method of clause 18 or 19, wherein the second latex copolymer or stage is formed as an initial stage of a multi-stage latex and the first latex copolymer or stage is formed as a subsequent stage of the multi-stage latex.

Clause 22: The aqueous adhesive composition or method of clause 18 or 19, wherein the first latex copolymer or stage and the second latex copolymer or stage are separate polymers mechanically mixed in the latex emulsion.

Clause 23: The aqueous adhesive composition or method of any one of clauses 18 to 22, wherein the first latex copolymer or stage is chemically different from the second latex copolymer or stage.

Clause 24: The aqueous adhesive composition or method of any one of clauses 18 to 23, wherein the (meth)acrylate monomer other than the vinyl monomer comprises butyl acrylate.

Clause 22: The aqueous adhesive composition or method of any one of clauses 16 to 20, wherein the (meth)acrylate monomer other than the vinyl monomer comprises a mixture of butyl acrylate and methyl methacrylate.

Clause 23: The aqueous adhesive composition or method of any one of clauses 14 to 22, wherein the reactants or the first reactants comprise at least 25 wt. % of the vinyl monomer having an alkyl group including between 2 and 20 carbon atoms, based on the total weight of ethylenically unsaturated monomers used to make the latex copolymer or the first latex copolymer or stage.

Clause 24: The aqueous adhesive composition or method of any one of clauses 14 to 22, wherein the reactants or first reactants comprise at least 30 wt. % of the vinyl monomer having an alkyl group including between 2 and 20 carbon atoms, based on the total weight of ethylenically unsaturated monomers used to make the latex copolymer or the first latex copolymer or stage.

Clause 25: The aqueous adhesive composition or method of any one of clauses 14 to 22, wherein the reactants or the first reactants comprise at least 50 wt. % of the vinyl monomer having an alkyl group including between 2 and 20 carbon atoms, based on the total weight of ethylenically unsaturated monomers used to make the latex copolymer or the first latex copolymer or stage.

Clause 26: The aqueous adhesive composition or method of any one of clauses 14 to 22, wherein the reactants or the first reactants comprise between 20 and 50 wt. % of the vinyl monomer having an alkyl group including between 2 and 20 carbon atoms, based on the total weight of ethylenically unsaturated monomers used to make the latex copolymer or the first latex copolymer or stage.

Clause 27: The aqueous adhesive composition or method of any one of clauses 14 to 26, wherein the vinyl monomer having an alkyl group including between 2 and 20 carbon atoms comprises laurel methacrylate, n-butyl methacrylate, iso-butyl methacrylate, t-butyl methacrylate, sec-butyl methacrylate, 2-ethylhexyl methacrylate, VeoVa™ 10, or combinations thereof.

Clause 28: The latex emulsion, aqueous adhesive composition, or method of any one of clauses 1 to 27, wherein the reactants or the first reactants further comprise: an ethylenically unsaturated polar monomer; and a chain transfer agent.

Clause 29: The latex emulsion, aqueous adhesive composition, or method of clause 28, wherein the reactants or the first reactants comprise at least about 0.1 wt. % of the ethylenically unsaturated polar monomer, based on the total weight of ethylenically unsaturated monomers used to make the latex copolymer or first latex copolymer or stage.

Clause 30: The latex emulsion, aqueous adhesive composition, or method of clause 28, wherein the reactants or the first reactants comprise between about 0.1 and about 10 wt. % of the ethylenically unsaturated polar monomer, based on the total weight of ethylenically unsaturated monomers used to make the latex copolymer or the first latex copolymer or stage.

Clause 31: The latex emulsion, aqueous adhesive composition, or method of clause 28, wherein the reactants or the first reactants comprise between about 0.1 and about 5 wt. % of the ethylenically unsaturated polar monomer, based on the total weight of ethylenically unsaturated monomers used to make the latex copolymer or the first latex copolymer or stage.

Clause 32: The latex emulsion, aqueous adhesive composition, or method of any one of clauses 28 to 31, wherein the ethylenically unsaturated polar monomer comprises an acid-functional ethylenically unsaturated monomer.

Clause 33: The latex emulsion, aqueous adhesive composition, or method of clause 32, wherein the ethylenically unsaturated acid-functional monomer comprises acrylic acid, methacrylic acid, an at least partially neutralized acrylic acid, an at least partially neutralized methacrylic acid, or combinations thereof.

Clause 34: The latex emulsion, aqueous adhesive composition, or method of any one of clauses 28 to 33, wherein the reactants or the first reactants comprise at least about 0.1 wt. % of the chain transfer agent, based on the total weight of ethylenically unsaturated monomers used to make the latex copolymer or the first latex copolymer or stage.

Clause 35: The latex emulsion, aqueous adhesive composition, or method of any one of clauses 28 to 33, wherein the reactants or the first reactants comprise between about 0.1 and about 1 wt. % of the chain transfer agent, based on the total weight of ethylenically unsaturated monomers used to make the latex copolymer or the first latex copolymer or stage.

Clause 36: The latex emulsion, aqueous adhesive composition, or method of any one of clauses 28 to 35, wherein the chain transfer agent comprises a mercaptan.

Clause 37: The latex emulsion, aqueous adhesive composition, or method of clause 36, wherein the chain transfer agent comprises dodecyl mercaptan.

Clause 38: The latex emulsion, aqueous adhesive composition, or method of any one of clauses 1 to 37, wherein the reactants or the first reactants further comprise a second (meth)acrylate, wherein the second (meth)acrylate forms a homopolymer that has a glass transition temperature that is less than −25° C.

Clause 39: The latex emulsion, aqueous adhesive composition, or method of clause 38, wherein the second (meth) acrylate comprises an alkyl acrylate.

Clause 40: The latex emulsion, aqueous adhesive composition, or method of clause 38, wherein the second (meth) acrylate comprises 2-ethylhexyl acrylate.

Clause 41: The latex emulsion, aqueous adhesive composition, or method of any one of clauses 38 to 40, wherein the reactants or the first reactants comprise between about 20 and about 80 wt. % of the second (meth)acrylate, based on the total weight of ethylenically unsaturated monomers used to make the latex copolymer or the first latex copolymer or stage.

Clause 42: The latex emulsion, aqueous adhesive composition, or method of any one of clauses 1 to 41, wherein the reactants, the first reactants, or the second reactants further comprise a ureido-functional monomer.

Clause 43: The latex emulsion, aqueous adhesive composition, or method of clause 42, wherein the ureido-functional monomer comprises a ureido-functional ethylenically unsaturated monomer.

Clause 44: The latex emulsion, aqueous adhesive composition, or method of any one of clauses 1 to 43, wherein the latex copolymer or the first latex copolymer exhibits a volume average particle size of between about 150 nm and about 550 nm.

Clause 45: The latex emulsion, aqueous adhesive composition, or method of any one of clauses 1 to 44, wherein a coating formed from the latex emulsion or the aqueous adhesive composition exhibits a dry adhesion of greater than about 8 pounds per linear inch when applied between a thermoplastic polyolefin roofing membrane and a plywood roofing substrate and subjected to 180° peel testing.

Clause 46: The latex emulsion, aqueous adhesive composition, or method of any one of clauses 1 to 45, wherein the latex copolymer or the first latex copolymer exhibits a glass transition temperature of less than about −10° C.

Clause 47: The latex emulsion, aqueous adhesive composition, or method of any one of clauses 1 to 46, wherein the latex copolymer or the first latex copolymer exhibits a glass transition temperature of between about −50° C. and about −20° C.

Clause 48: The latex emulsion, aqueous adhesive composition, or method of any one of clauses 1 to 47, wherein the latex copolymer, the first latex copolymer, or a latex copolymer formed from the first latex stage and the second latex stage exhibits a gel fraction of between 0% and about 5%, and wherein the solubilized portion of the latex copolymer, the first latex copolymer, or a latex copolymer formed from the first latex stage and the second latex stage exhibits a weight average molecular weight of less than about 230,000 g/mol.

Clause 49: The latex emulsion, aqueous adhesive composition, or method of any one of clauses 1 to 47, wherein the latex copolymer, the first latex copolymer, or a latex copolymer formed from the first latex stage and the second latex stage exhibits a gel fraction of between 0% and about 3.5%, and wherein the solubilized portion of the latex copolymer, the first latex copolymer, or a latex copolymer formed from the first latex stage and the second latex stage exhibits a weight average molecular weight of between about 50,000 g/mol and about 200,000 g/mol.

Clause 50: The latex emulsion, aqueous adhesive composition, or method of any one of clauses 1 to 49, wherein the reactants, the first reactants, or the second reactants further comprise a seed latex.

Clause 51: The latex emulsion, aqueous adhesive composition, or method of any one of clauses 1 to 50, wherein the latex emulsion or the aqueous adhesive composition comprises less than about 25 g/L volatile organic compounds.

Clause 52: The aqueous adhesive composition of any one of clauses 14, 16, or 18 to 51, further comprising the biocide or the fungicide.

Clause 53: The aqueous adhesive composition of any one of clauses 14, 16, or 18 to 52, further comprising the UV stabilizer.

Clause 54: The aqueous adhesive composition of any one of clauses 14, 16, or 18 to 53, further comprising the thickener.

Clause 55: The aqueous adhesive composition of any one of clauses 14, 16, or 18 to 54, further comprising the wetting agent.

Clause 56: The aqueous adhesive composition of any one of clauses 14, 16, or 18 to 55, further comprising the defoamer.

Clause 57: The aqueous adhesive composition of any one of clauses 14, 16, or 18 to 56, further comprising the filler.

Clause 58: The aqueous adhesive composition of any one of clauses 14, 16, or 18 to 57, further comprising the pigment or colorant.

Clause 59: The aqueous adhesive composition of any one of clauses 14, 16, or 18 to 58, further comprising the coalescent.

Clause 60: The aqueous adhesive composition of any one of clauses 14, 16, or 18 to 59, further comprising the tackifier.

Clause 61: A roofing material comprising: a polymeric roofing membrane; and an adhesive on a surface of the polymeric roofing membrane, wherein the adhesive comprises the latex emulsion or aqueous adhesive composition of any one of clauses 1 to 14, 16, or 18 to 60; and a backing membrane removably on the adhesive.

Clause 62: A method comprising: adhering a polymeric roofing membrane to a roofing substrate using the latex emulsion or aqueous adhesive composition of any one of clauses 1 to 14, 16, or 18 to 60.

Clause 63: The roofing system or method of clause 61 or 62, wherein the polymeric roofing membrane comprises thermoplastic polyolefin (TPO) membrane, ethylene propylene diene monomer (EPDM) rubber membrane, or poly (vinyl chloride) membrane.

The disclosure will now be illustrated with reference to the following non-limiting examples.

EXAMPLES

Synthesis Example 1

A monomer emulsion was made by first adding 330 g deionized water and 46.7 g Rhodafac BS-715 (available from Solvay S.A., Neder-Over-Heembeek, Brussels, Belgium) to a beaker and agitating. Then, each of the following was added: 33.6 g methacrylic acid, 22.8 g ureido-functional methacrylic monomer, 5.0 g ammonium hydroxide (28%), 6.0 g dodecyl mercaptan, 510 g 2-ethylhexyl acrylate, and 600 g n-butyl methacrylate.

To a 3-liter cylindrical flask was charged 400 grams (g) deionized water and 40 g acrylic seed latex (30% non-volatile material). The flask was fitted with an agitator and a flask head and placed in a water bath heated to 80° C. When the reaction flask had equilibrated at 80° C., 3.6 g ammonium persulfate in 50 g of deionized water was added to the flask and held for 5 minutes.

After the hold, the monomer emulsion was fed to the flask over the course of 3 hours. Simultaneously, a solution of 1.2 g ammonium persulfate in 70 g deionized water was fed to the reactor over 3 hours. Temperature of the flask was maintained at between 80° C. and 85° C. throughout the additions.

At the conclusion of the feeds, the flask was held at 80° C. for 30 minutes before cooling to 60° C. and beginning redox post reaction. For the redox post reaction, an oxidizer solution was prepared by adding 1.7 g t-butyl hydroperoxide to 20 g deionized water with agitation. A reducer solution was prepared by adding 1.2 g erythorbic acid to 20 g deionized water with agitation. Following the post redox feed, the flask was cooled to 40° C., at which time 6.0 g ammonium hydroxide and 8.0 g 1,2-benzisothiazolin-3-one (a biocide available under the trade designation Proxel™ AQ from Lonza Group, Basel, Switzerland) were added to the flask.

The resulting latex emulsion had solids content of about 54.5%, a pH of about 7.6, a volume average particle size of about 197 nm, a measured $T_g$ of about −26° C., and is labelled Sample 1. Solids content was measured as follows: an aluminum weighing dish was weighted on an analytical balance and the weight recorded. Between about 0.5 g and about 0.75 g of latex was added to weighing dish and the weight recorded. The initial pan weight was subtracted from the pan plus latex weight to determine the weight of latex in the pan. Between about 1 g and about 2 g of water was added to the pan, and the pan was placed on a hot plate at 300° F. (about 148.9° C.) for 30 minutes. The pan was then cooled and re-weighed. The initial weight of the pan (without latex) was subtracted from the weight of the dried weight plus pan to determine the weight of the dried latex. The weight of the dried latex was divided by the weight of the starting latex to determine percent solids.

The volume average particle size may be determined using a Nanotrac Wave II particle size analyzer from Microtrac Inc., Montgomeryville, Pennsylvania.

The glass transition temperature was measured by air drying a sample overnight and analyzing the dried sample on a Q2000 DSC from TA Instruments using a heat-cool-heat cycle from −75° C. to 150° C. and back at a rate of 20° C.

per minute. The glass transition temperature was measured from the midpoint of the transition on the second heat cycle.

Synthesis Example 2

A monomer emulsion was made by first adding 650 g deionized water and 92 g Abex EP 100 (available from Solvay S.A., Neder-Over-Heembeek, Brussels, Belgium) to a beaker and agitating. Then, each of the following was added: 44.9 g methacrylic acid, 26.4 g ureido-functional methacrylic monomer, 10 g ammonium hydroxide (28%), 2.8 g dodecyl mercaptan, 2017 g butyl acrylate, and 143 g methyl methacrylate.

To a 4-liter cylindrical flask was charged 400 grams (g) deionized water and 109 g acrylic seed latex (45% non-volatile material). The flask was fitted with an agitator and a flask head and placed in a water bath heated to 80° C. When the reaction flask had equilibrated at 80° C., 6.9 g ammonium persulfate in 50 g of deionized water was added to the flask and held for 5 minutes.

After the hold, the monomer emulsion was fed to the flask over the course of 4 hours. Simultaneously, a solution of 2.3 g ammonium persulfate in 70 g deionized water was fed to the reactor over 4 hours. Temperature of the flask was maintained at between 80° C. and 85° C. throughout the additions.

At the conclusion of the feeds, the flask was held at 80° C. for 30 minutes before cooling to 60° C. and beginning redox post reaction. For the redox post reaction, an oxidizer solution was prepared by adding 7.6 g t-butyl hydroperoxide to 20 g deionized water with agitation. A reducer solution was prepared by adding 4.8 g BRUGGOLITE® FF6 (available from Bruggemann Chemical, Heilbronn, Germany) to 20 g deionized water with agitation. Following the post redox feed, the flask was cooled to 40° C., at which time 4.0 g ammonium hydroxide and 12.0 g 1,2-benzisothiazolin-3-one (a biocide available under the trade designation Proxel™ AQ from Lonza Group, Basel, Switzerland) were added to the flask.

The resulting latex emulsion had solids content of about 57.1%, a pH of about 7.01, a volume average particle size of about 294 nm, a measured $T_g$ of about −34° C., and is labelled Sample 2. Solids content, volume average particle size, and $T_g$ were measured as described above in Synthesis Example 1.

Synthesis Example 3

A first monomer emulsion was made by first adding 190 g deionized water and 14.4 g Rhodafac BS-715 (available from Solvay S.A.) to a first beaker and agitating. Then, each of the following was added: 14.0 g methacrylic acid, 7.8 g ureido-functional methacrylate, 4.0 g ammonium hydroxide (28%), 0.8 g dodecyl mercaptan, 586 g n-butyl acrylate, and 44 g methyl methacrylate.

A secondary monomer emulsion was made by first adding 200 g deionized water and 14.4 g Rhodafac BS-715 to a second beaker and agitating. Then, each of the following was added: 19.6 g methacrylic acid, 7.8 g ureido-functional methacrylate, 5.5 g ammonium hydroxide (28%), 3.5 g dodecyl mercaptan, 297 g 2-ethylhexyl acrylate, and 350 g n-butyl methacrylate.

An initiator solution of 1.4 g ammonium persulfate in 70 g deionized water was prepared as a co-feed for the polymerization.

To a 3-liter cylindrical flask was charged 385 grams (g) deionized water and 101 g acrylic seed latex (45% non-volatile material). The flask was fitted with an agitator and a flask head and placed in a water bath heated to 80° C. When the reaction flask had equilibrated at 78° C., 4.9 g ammonium persulfate in 50 g of deionized water was added to the flask and held for 5 minutes.

After the hold, the first monomer emulsion was fed to the flask over the course of 90 hours. Simultaneously, the initiator solution was fed to the reactor over 3 hours. Temperature of the flask was maintained at between 80° C. and 85° C. throughout the additions.

Upon completion of the first monomer emulsion, the lines were rinsed with 20 deionized water. The second monomer emulsion was then fed to the flask over 90 minutes. Upon completion of the second monomer emulsion, the lines were rinsed with 20 deionized water.

At the conclusion of the feeds, the flask was held at 80° C. for 45 minutes before cooling to 60° C. and beginning redox post reaction. For the redox post reaction, 1.4 g t-butyl hydroperoxide and 1.2 g erythorbic acid were added to the flask. After 20 minutes, the flask was cooled to 40° C., at which time 6.5 g ammonium hydroxide and 12.0 g 1,2-benzisothiazolin-3-one (a biocide available under the trade designation Proxel™ AQ from Lonza Group) were added to the flask.

The resulting latex emulsion had solids content of about 56.3%, a pH of about 8.9, a volume average particle size of about 289 nm, and is labelled Sample 3. Solids content, volume average particle size, and $T_g$ were measured as described above in Synthesis Example 1. Dry adhesion testing was performed as described below and performance was acceptable.

Dry Adhesion Testing Example 1

Figure 2:
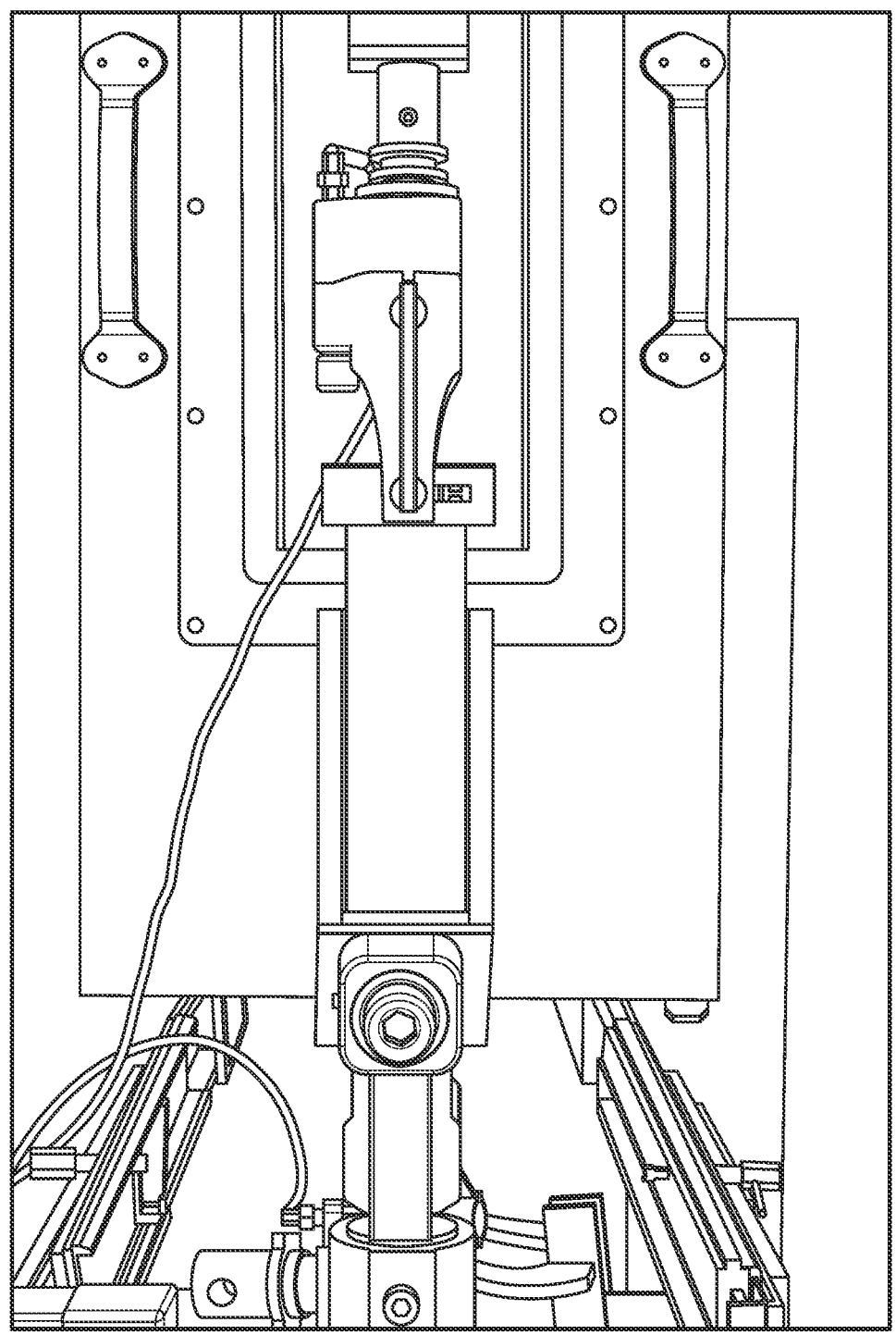
FIGS. 2-4 are images of a test apparatus at different points in a dry adhesion test.
Figure 3:
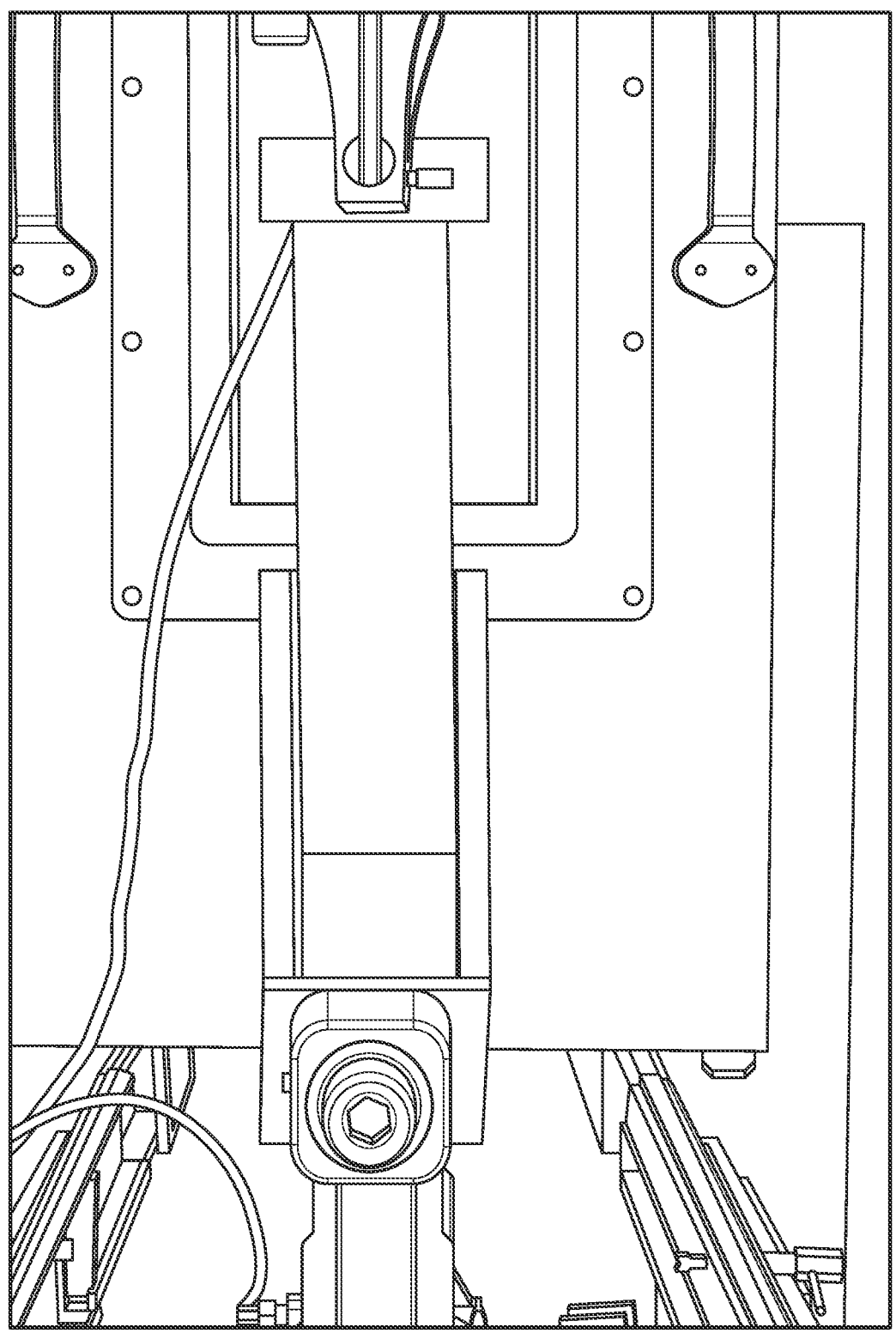
Figure 4:
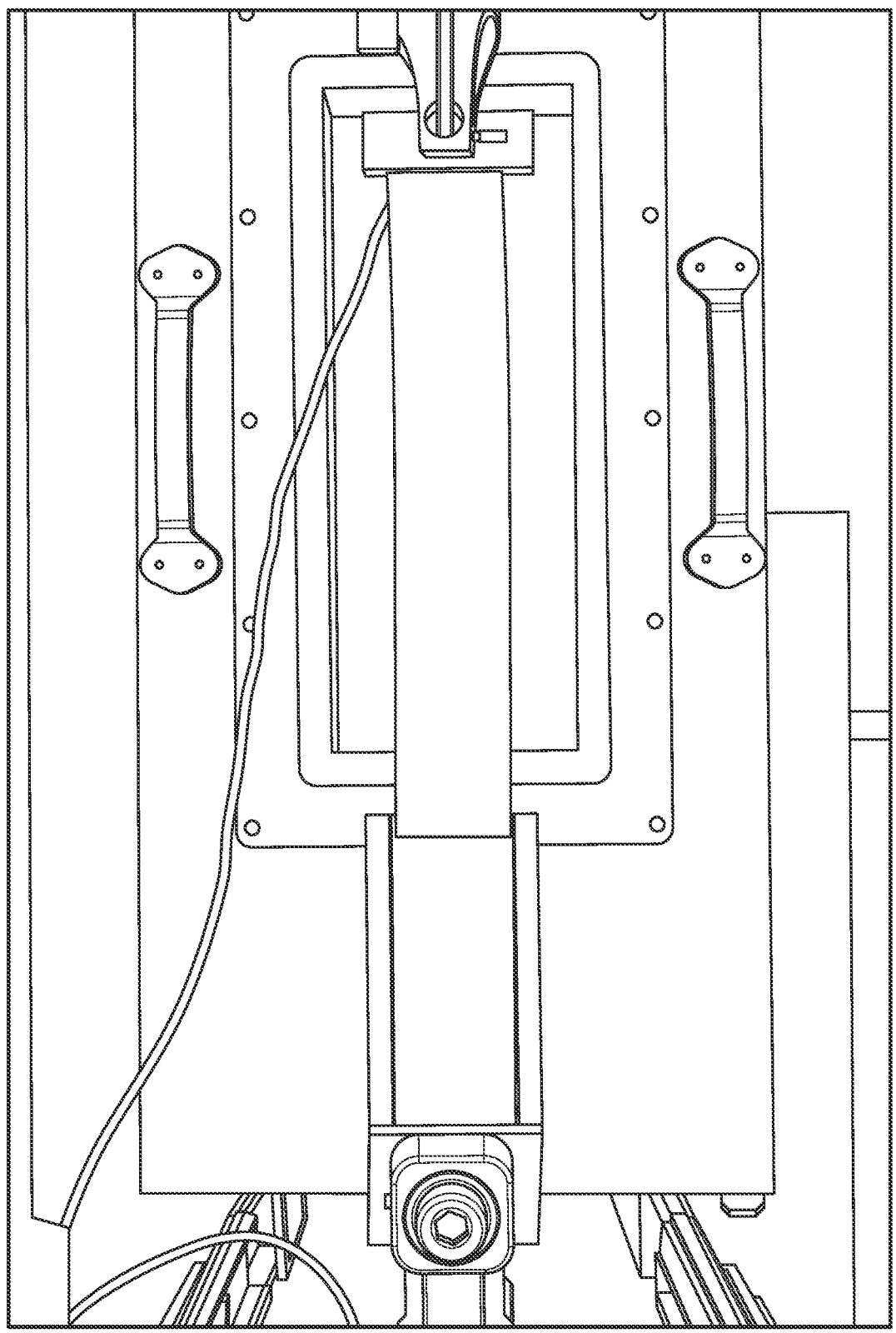

For adhesion testing for this and all subsequent examples, adhesives were prepared by combining the latex emulsion sample with Acrysol ASE-60 (Dow Chemical Co., Midland, Michigan) at a ratio of 60 parts dry resin solids to 0.5 parts Acrysol ASE-60. Dry adhesion was tested according to the dry adhesion testing procedure outlined above, which is the ASTM D903 test procedure, with a modified pull rate of 2 inches per minute (5.08 cm per minute). FIGS. 2-4 are images of the test apparatus at different points in the dry adhesion test. FIG. 2 shows the lower clamp holding the CDX plywood panel and an upper clamp holding the TPO membrane. The TPO membrane is adhered to the CDX plywood panel using the sample composition. FIG. 3 shows the apparatus at a midpoint of the dry adhesion test. FIG. 4 shows the apparatus near the end of the dry adhesion test.

Sample 1 and Sample 2 were tested alone, and also mixed at various levels based on total resin solids. As seen in Table 1, the blending of Sample 1 and Sample 2 showed a synergistic effect. The adhesive performance improved with a blend of between 25% and 75% Sample 2 and showed best performance of the mixtures tested at a 50/50 blend. The peel adhesion is shown in Table 1.

TABLE 1

| Composition | Peel Adhesion (pounds per linear inch) | Mode of Failure |
| --- | --- | --- |
| Sample 1 | 4 | Cohesive |
| 75% Sample 1 + 25% Sample 2 | 6 | Cohesive |
| 50% Sample 1 + 50% Sample 2 | 8 | Cohesive |
| 25% Sample 1 + 75% Sample 2 | 5 | Adhesive/Cohesive |
| Sample 2 (comparative) | 0.5 | Adhesive |

Chain Transfer Agent Series Example 1

A series of latex emulsion samples were prepared with varying dodecyl mercaptan levels. The latex emulsion samples were prepared according to Synthesis Example 1 aside from varying the dodecyl mercaptan level. The prepared samples were labeled Samples 4-7.

Gel Fraction was determined using the following procedure. Samples to be analyzed were dried overnight. A half-sealed pouch was formed by taking one membrane disc (a Waters PTFE membrane disc with a 47 mm diameter and 0.45 μm pore size from Waters Corporation, Milford, Massachusetts), folding it in half and folding over the edge, then heat sealing with a butane torch. Pouch weight was recorded (Pouch Weight) and approximately 30 mg of dried latex sample was added to the pouch. Actual weight of the pouch plus sample was recorded (Sample Weight). The pouch was then heat sealed using the butane torch. The sealed pouch was placed in a 20 mL vial filled with tetrahydrofuran (THF) and allowed to soak for 24 hours. The swollen pouch was removed after 24 hours and oven dried at 110° C. for 1 hour. The weight of the dry pouch (Final Weight) was recorded.

The gel fraction was then calculated as:

$$\text{Gel Fraction} = \frac{\text{Final Weight} - \text{Pouch Weight}}{\text{Sample Weight}}$$

Weight average molecular weight of the material remaining in the THF vial was determined using Gel Permeation Chromotography (GPC) using a Waters ACQUITY™ p-isocratic solvent manager pump with Jordi columns at 45° C., a Waters ACQUITY™ UPLC Refractive Index Detector, and Waters Empower 3 data processing system (all from Waters Corporation). THF was used as the eluent with a polystyrene standard.

The latex emulsion samples with varying dodecyl mercaptan levels were coated onto exterior grade roofing plywood as outlined in the dry adhesion testing procedure outlined above, but with a coat weight of about 9 lbs/100 ft² (about 0.439 kg/m²) using a spreader to give more uniform coating weight across the test area. Peel adhesion was determined using the dry adhesion testing procedure described above. The gel fraction, weight average molecular weight, glass transition temperature, and peel adhesion for the series of latex emulsion samples prepared with varying dodecyl mercaptan levels are shown in Table 2, where DDM content indicates the dodecyl mercaptan content. The $T_g$ was determined as described above.

TABLE 2

| Sample | DDM Content (g) | Gel Fraction (%) | Weight Average Molecular Weight (Da) | $T_g$ (° C.) | Peel Adhesion (pounds per linear inch) |
|---|---|---|---|---|---|
| 4 | 6 | 2.0 | 55,687 | −27.5 | 6.540 |
| 5 | 3 | 3.2 | 124,627 | −24.4 | 32 |
| 6 | 1.5 | 5.7 | 225,761 | −25.8 | NA |
| 7 | 0 | 52.7 | 318,679 | −20.5 | 0.63 |

Chain Transfer Agent Series Example 2

Samples 4-7 were blended with Sample 2 in a 50/50 ratio by total resin solids.

The latex emulsion samples with varying dodecyl mercaptan levels were coated onto exterior grade roofing plywood as outlined in the dry adhesion testing procedure outlined above, but with a coat weight of about 9 lbs/100 ft² (about 0.439 kg/m²). Peel adhesion was determined using the dry adhesion testing procedure described above. The peel adhesion is shown in Table 3.

TABLE 3

| Sample | Peel Adhesion (pounds per linear inch) | Mode of Failure |
|---|---|---|
| 4 + 2 | 11.8 | Cohesive |
| 5 + 2 | 13.9 | Adhesive/Cohesive |
| 6 + 2 | 4.1 | Adhesive/Cohesive |
| 7 + 2 | 1.4 | Adhesive |

Butyl Methacrylate Series Example 1

A series of latex emulsion samples were prepared with varying butyl methacrylate levels. The latex emulsion samples were prepared according to Synthesis Example 1 aside from varying the butyl methacrylate level. The prepared samples were labelled Samples 9-12. The latex emulsions were then blended with Sample 2 in a 50/50 ratio by total resin solids.

The latex emulsion samples with varying butyl methacrylate levels were coated onto exterior grade roofing plywood as outlined in the dry adhesion testing procedure outlined above, but with a coat weight of about 9 lbs/100ft² (about 0.439 kg/m²). Peel adhesion was determined using the dry adhesion testing procedure described above. For the data shown in Table 4, the same TPO roofing membrane was used as described in the dry adhesion testing procedure. For the data shown in Table 5, the TPO roofing membrane was replaced with a 2-inch (about 5.08 cm) wide, 60-mil (about 0.1524 cm) thick EPDM rubber membrane from Mule-Hide® Products Co, Inc., Beloit, Wisconsin. The peel adhesion is shown in Tables 4 and 5.

TABLE 4

| Sample | Peel Adhesion on TPO (pounds per linear inch) | Mode of Failure | BMA Level in First Latex Emulsion (wt. %) |
|---|---|---|---|
| 9 + 2 (Comparative) | 1.623 | Adhesive | 0 |
| 10 + 2 | 4.601 | Adhesive | 25 |
| 11 + 2 | 14.741 | Cohesive | 37.5 |
| 12 + 2 | 13.126 | Cohesive | 50 |

TABLE 5

| Sample | Peel Adhesion on EPDM (pounds per linear inch) | Mode of Failure | BMA Level in First Latex Emulsion (wt. %) |
|---|---|---|---|
| 9 + 2 (Comparative) | 1.424 | Adhesive | 0 |
| 10 + 2 | 3.131 | Adhesive | 25 |
| 11 + 2 | 5.798 | Cohesive | 37.5 |
| 12 + 2 | 6.659 | Cohesive | 50 |

Synthesis Example 4

A series of samples were prepared according to Latex Emulsion Synthesis Example 1, except the 2-ethylhexyl acrylate and n-butyl methacrylate were replaced with the monomers (and monomer ratios) shown in Table 6. The remaining weight content of monomers not shown in Table 6 were filled by the other functional monomers in the same amounts listed in Latex Emulsion Synthesis Example 1.

TABLE 6

| Sample | Monomers |
| --- | --- |
| 13 | 37 wt. % VeoVa ™ 10 |
|  | 42.5 wt. % ethylhexyl acrylate |
|  | 13 wt. % methyl methacrylate |
| 14 | 37.5 wt. % hydroxypropyl acrylate |
|  | 38.5 wt. % 2-ethylhexyl acrylate |
|  | 16.5 wt. % methyl methacrylate |
| 15 | 37.5 wt. % 2-ethylhexyl methacrylate |
|  | 55 wt. % butyl acrylate |

The latexes were then formulated consistent with Dry Adhesion Testing Example 1, mixed in a 50-50 ratio by weight with an all acrylic latex pressure sensitive adhesive available under the trade designation EPS 2113 from Engineered Polymer Solutions, Inc., Marengo, Illinois Peel adhesion testing on TPO was conducted consistent with the test method set forth above. Peel testing results are shown in Table 7.

TABLE 7

| Sample | Average peel force after 24-hour dwell at room temperature (lbf/in) | Failure Mode | Average peel force after 7-day dwell at room temperature (lbf/in) | Failure Mode |
| --- | --- | --- | --- | --- |
| 13 + 2133 | 7.65 | Cohesive | 12.253 | Cohesive |
| 14 + 2133 (Comparative) | 6.763 | Cohesive | 0.379 | Adhesive |
| 15 + 2133 | 5.54 | Cohesive | 9.089 | Cohesive |

Various examples have been described. These and other examples are within the scope of the following claims.

What is claimed is:

1. A latex emulsion adhesive composition for application to polymeric roofing membranes, the latex emulsion adhesive composition comprising:
    an aqueous carrier liquid;
    a first latex copolymer or stage formed from reactants comprising a vinyl monomer comprising butyl methacrylate, wherein the reactants comprise about 25 to about 50 weight percent of butyl methacrylate, based on the total weight of ethylenically unsaturated monomers used to make the latex copolymer, and wherein a homopolymer formed from the vinyl monomer exhibits a glass transition temperature of between about −10° C. and about 30° C.;
    wherein the first latex copolymer or stage exhibits a glass transition temperature of less than −15° C.;
    a second latex copolymer or stage formed from second reactants comprising a (meth)acrylate monomer that does not include butyl methacrylate;
    wherein the first latex copolymer or stage is chemically different from the second latex copolymer or stage;
    wherein the first latex copolymer or stage and the second latex copolymer or stage are present in the composition in a weight ratio of about 4:1 to about 1:4; and
    wherein a coating formed from the aqueous adhesive composition exhibits a dry adhesion of greater than about 4 pounds per linear inch when applied between a thermoplastic polyolefin roofing membrane and a plywood roofing substrate at an average coat weight of about 6 lbs/100 ft$^2$ and subjected to 180° peel testing according to ASTM D903 with a 2-inch per minute pull rate.

2. The composition of claim 1, wherein the first latex copolymer or stage is formed as an initial stage of a multi-stage latex and the second latex copolymer or stage is formed as a subsequent stage of the multi-stage latex.

3. The composition of claim 1, wherein the second latex copolymer or stage is formed as an initial stage of a multi-stage latex and the first latex copolymer or stage is formed as a subsequent stage of the multi-stage latex.

4. The composition of claim 1, wherein the first latex copolymer or stage and the second latex copolymer or stage are separate polymers mechanically mixed in the latex emulsion.

5. The composition of claim 1, further comprising a dispersant, a biocide, a fungicide, an UV stabilizer, a thickener, a wetting agent, a defoamer, a filler, a pigment or colorizer, a tackifier, or combinations thereof.

6. The composition of claim 1, wherein the reactants comprise between 20 and 50 wt. % of the vinyl monomer comprising butyl methacrylate, ethylhexyl methacrylate, a vinyl ester of neodecanoic acid, or combinations thereof based on the total weight of ethylenically unsaturated monomers used to make the latex copolymer or the first latex copolymer or stage.

7. The composition of claim 1, wherein the vinyl monomer comprises n-butyl methacrylate or a mixture of n-butyl methacrylate and ethylhexyl methacrylate.

8. The composition of claim 1, wherein the reactants or the first reactants further comprise:
    an ethylenically unsaturated polar monomer; and
    a chain transfer agent.

9. The composition of claim 8, wherein the chain transfer agent comprises dodecyl mercaptan.

10. The composition of claim 1, wherein the reactants further comprise a second (meth)acrylate, wherein the second (meth)acrylate forms a homopolymer that has a glass transition temperature that is less than −25° C.

11. The composition of claim 1, wherein the reactants further comprise a ureido-functional monomer.

12. The composition of claim 1, wherein a coating formed from the latex emulsion or the aqueous adhesive composition exhibits a dry adhesion of greater than about 8 pounds per linear inch when applied between a thermoplastic polyolefin roofing membrane and a plywood roofing substrate and subjected to 180° peel testing.

13. The composition of claim 1, wherein the latex copolymer exhibits a gel fraction of between 0% and about 5%, and wherein the solubilized portion of the latex copolymer exhibits a weight average molecular weight of less than about 230,000 g/mol.

* * * * *